United States Patent
Bhattad et al.

(10) Patent No.: US 10,588,119 B2
(45) Date of Patent: Mar. 10, 2020

(54) CRS BANDWIDTH SIGNALING

(71) Applicant: QUALCOMM Incorporated, San Diego, CA (US)

(72) Inventors: Kapil Bhattad, Bangalore (IN); Alberto Rico Alvarino, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/926,848

(22) Filed: Mar. 20, 2018

(65) Prior Publication Data
US 2018/0279272 A1    Sep. 27, 2018

(30) Foreign Application Priority Data

Mar. 24, 2017    (IN) .............................. 201741010456
Apr. 5, 2017    (IN) .............................. 201741012235

(51) Int. Cl.
*H04W 72/04*    (2009.01)
*H04L 5/00*    (2006.01)
(Continued)

(52) U.S. Cl.
CPC ........... *H04W 72/042* (2013.01); *H04L 5/005* (2013.01); *H04L 5/0048* (2013.01);
(Continued)

(58) Field of Classification Search
CPC ... H04L 5/0037; H04L 5/0053; H04L 5/0064; H04L 5/0048; H04L 5/005; H04L 5/00;
(Continued)

(56) References Cited

U.S. PATENT DOCUMENTS 9,219,994 B2 * 12/2015 Park ...................... H04W 4/06
9,622,230 B2 *  4/2017 Chen .................. H04W 72/042
(Continued)

FOREIGN PATENT DOCUMENTS

EP    3121986 A1    1/2017
WO    2013038865 A1    3/2013
(Continued)

OTHER PUBLICATIONS

Alcatel-Lucent, et al., "Reduced CRS Design on NCT," 3GPP Draft; R1-132955 Reduced CRS Design on NCT—Final, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19, 2013-Aug. 23, 2013, Aug. 10, 2013, XP050716191, 3 pages, Retrieved from the Internet: URL: http://www.3gpp.org/ftp/tsg_ran/WG1_RL1/TSGR1_74/Docs/ [retrieved on Aug. 10, 2013].
(Continued)

*Primary Examiner* — Man U Phan
(74) *Attorney, Agent, or Firm* — Arent Fox LLP

(57) ABSTRACT

A narrowband apparatus determines a set of monitored resource blocks (RBs) on a subframe for monitoring for CRS from a base station monitors for the CRS from the base station on the subframe based on the set of monitored RBs. The base station determines a bandwidth for transmitting the CRS to a user equipment, wherein the bandwidth is less than a system bandwidth and transmits the CRS to the UE using the determined bandwidth, wherein the UE monitors for the CRS on a set of monitored RBs. The set of monitored RBs may include RBs allocated for a PDCCH search space, PDCCH and/or PDSCH transmissions and may further include RBs M subframes after and/or N subframes before the monitored RBs. The set of monitored RBs may include X RBs around a PDCCH search space and/or PDSCH.

104 Claims, 14 Drawing Sheets

(51) Int. Cl.
  *H04W 24/08* (2009.01)
  *H04W 4/70* (2018.01)
  *H04W 88/02* (2009.01)
(52) U.S. Cl.
  CPC .......... *H04L 5/0053* (2013.01); *H04L 5/0064* (2013.01); *H04W 4/70* (2018.02); *H04W 24/08* (2013.01); *H04W 72/044* (2013.01); *H04L 5/0037* (2013.01); *H04W 88/02* (2013.01); *Y02D 70/00* (2018.01); *Y02D 70/1242* (2018.01); *Y02D 70/1262* (2018.01); *Y02D 70/142* (2018.01); *Y02D 70/20* (2018.01); *Y02D 70/21* (2018.01); *Y02D 70/26* (2018.01)
(58) Field of Classification Search
  CPC ... H04W 4/70; H04W 72/042; H04W 72/044; H04W 88/02; H04W 24/08; H04W 72/04; Y02D 70/1262; Y02D 70/1242; Y02D 70/142; Y02D 70/21; Y02D 70/26; Y02D 70/00; Y02D 70/20
  USPC .......................................... 370/329, 335, 339
  See application file for complete search history.

(56) References Cited

U.S. PATENT DOCUMENTS

| | | | |
|---|---|---|---|
| 9,681,428 B2* | 6/2017 | Bashar | H04L 5/0048 |
| 9,750,026 B1* | 8/2017 | Saxena | H04W 72/0453 |
| 9,769,817 B2* | 9/2017 | Xu | H04W 4/70 |
| 10,171,931 B2* | 1/2019 | You | H04W 72/04 |
| 10,218,482 B2* | 2/2019 | Lagerqvist | H04L 5/005 |
| 10,263,747 B2* | 4/2019 | You | H04L 5/00 |
| 2014/0177562 A1* | 6/2014 | Li | H04L 5/001 370/329 |
| 2014/0301262 A1 | 10/2014 | Homchaudhuri et al. | |
| 2016/0338062 A1 | 11/2016 | Rico-Alvarino et al. | |
| 2017/0171841 A1* | 6/2017 | Chen | H04L 5/0007 |
| 2017/0201989 A1 | 7/2017 | Fakoorian et al. | |
| 2017/0223725 A1 | 8/2017 | Xiong et al. | |
| 2018/0013529 A1 | 1/2018 | You et al. | |
| 2018/0077696 A1* | 3/2018 | Lee | H04W 72/02 |
| 2019/0028245 A1* | 1/2019 | Gao | H04W 48/10 |

FOREIGN PATENT DOCUMENTS

| | | |
|---|---|---|
| WO | 2016032381 A1 | 3/2016 |
| WO | 2016111549 A1 | 7/2016 |

OTHER PUBLICATIONS

International Search Report and Written Opinion—PCT/US2018/023548—ISA/EPO—dated Sep. 11, 2018.
Partial International Search Report—PCT/US2018/023548—ISA/EPO—dated Jul. 13, 2018.

* cited by examiner

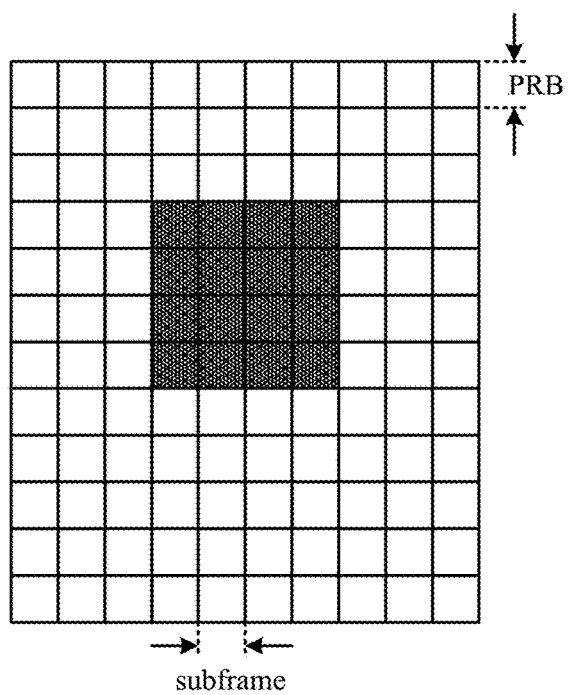
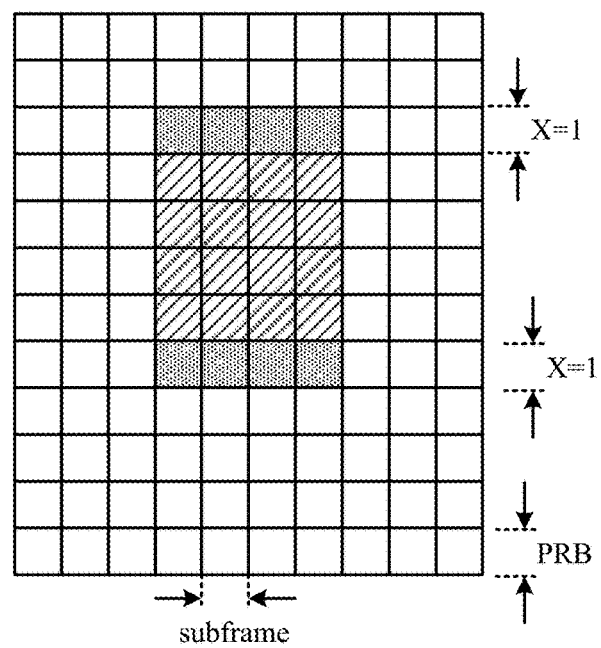
FIG. 13A
FIG. 13B

CRS BANDWIDTH SIGNALING

CROSS-REFERENCE TO RELATED APPLICATIONS

This application claims the benefit of Indian Application No. 201741012235, entitled "CRS Bandwidth Signaling" and filed on Apr. 5, 2017, and Indian Application No. 201741010456, entitled "CRS Bandwidth Signaling" and filed on Mar. 24, 2017, which are expressly incorporated by reference herein in their entirety.

BACKGROUND

Field

The present disclosure relates generally to communication systems, and more particularly, to cell specific reference signals (CRS) in narrowband (NB) wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

NB wireless communication involves unique challenges due to the limited frequency dimension of the narrow band. One example of such NB wireless communication is Narrowband Internet-of-Things (NB-IoT), which is limited to a single RB of system bandwidth, e.g., 180 kHz. Another example of NB wireless communication is enhanced Machine Type Communication (eMTC), which is limited to six RBs of system bandwidth. NB communication devices, e.g., such as eMTC devices or other devices using a limited amount of bandwidth, may decode channels based on CRS. CRS is typically sent over the entire system bandwidth. Although MTC UEs operate in a narrowband, the MTC UEs may also be capable of operation in a wider system bandwidth (e.g., 1.4/3/5/10/15/20 MHz). However, even with this wider system bandwidth capability, such devices may not be able to monitor the entire system bandwidth for CRS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

NB communication devices such as eMTC devices may decode channels based on CRS that may be sent over the entire system bandwidth. The eMTC devices operating in a narrowband may also be capable of operation in a wider system bandwidth (e.g., 1.4/3/5/10/15/20 MHz), but may not be able to monitor the entire system bandwidth for CRS. For example, a 1.4 MHz eMTC UE may be capable of monitoring a wider band CRS, e.g., up to 5 MHz, up to 10 MHz, up to 20 MHz, etc., but still might not be capable of monitoring an entire system bandwidth. In order to more efficiently use system resources and to reduce power usage, it may be beneficial for a base station to reduce the bandwidth that it uses to transmit CRS to such limited bandwidth devices.

Additionally, aspects are provided to reduce degradation of channel estimation/tracking loops that may be caused by a UE measuring CRS on RBs or subframes on which CRS is not actually present. For example, a UE may use any of a number of metrics to determine whether CRS is present on the subframe or not. The UE may refrain from using the CRS measurement for channel estimation/tracking loops when the UE determines using the metrics that CRS is not present. In another example, the UE may use other information to determine on which RBs or subframes CRS should be present.

In an example, CRS may be present in a first set of resource blocks allocated for a physical downlink control channel (PDCCH) search space, or a PDCCH transmission, and/or a second set of resource blocks allocated for a physical downlink shared channel (PDSCH) transmission. CRS may also be present in a third set of resource blocks N subframes before the first set of resource blocks allocated for the PDCCH search space or a PDCCH transmission or second set of resource blocks allocated for the PDSCH transmission and/or a fourth set of resource blocks M subframes after the first set of resource blocks allocated for the PDCCH search space or second set of resource blocks allocated for the PDSCH transmission. The CRS may further be present in X resource blocks around the first set of resource blocks allocated for the PDCCH search space or a PDCCH transmission or second set of resource blocks allocated for the PDSCH transmission. The variables, M, N, X, etc. may be different for a PDCCH search space, a PDCCH transmission, and/or a PDSCH.

In an aspect of the disclosure, a method, a computer-readable medium, and an apparatus are provided for wireless communication at a UE. The apparatus determines a set of monitored resource blocks for monitoring for CRS from a base station. The set of monitored resource blocks may be less than a system bandwidth, e.g., based on a bandwidth capability of the apparatus. The apparatus monitors for the CRS from the base station based on the set of monitored resource blocks. The set of monitored RBs may include a first set of resource blocks allocated for a PDCCH search space and/or a second set of resource blocks allocated for a PDSCH transmission. The set of monitored RBs may further include in a third set of resource blocks N subframes before the first set of resource blocks allocated for the PDCCH search space or second set of resource blocks allocated for the PDSCH transmission and/or a fourth set of resource blocks M subframes after the first set of resource blocks allocated for the PDCCH search space or second set of resource blocks allocated for the PDSCH transmission. The set of monitored RBs may further include X, Y resource blocks around the first set of resource blocks allocated for the PDCCH search space or second set of resource blocks allocated for the PDSCH transmission.

In another aspect of the disclosure, a method, a computer-readable medium, and an apparatus are provided for wireless communication at a base station. The apparatus determines a bandwidth for transmitting a CRS to a user equipment, wherein the bandwidth is less than a system bandwidth. Then, the apparatus transmits the CRS to the UE using the determined bandwidth, wherein the UE monitors for the CRS on a set of monitored resource blocks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 13A and 13B illustrate an example of resources for CRS.

DETAILED DESCRIPTION

Figure 1:
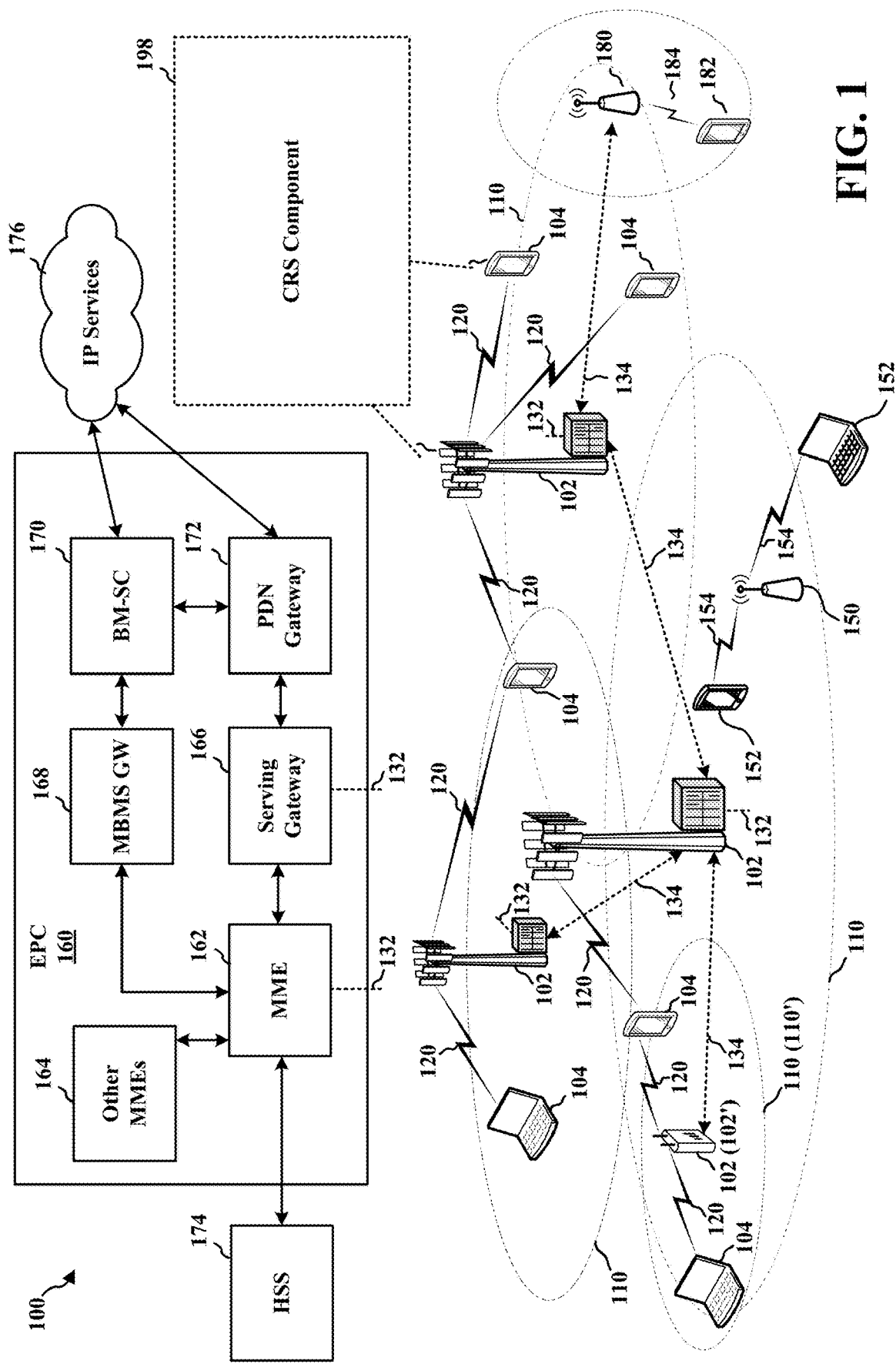
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to monitor CRS based on a set of monitored RBs and the base station 102 may be configured to transmit CRS using a bandwidth based on the set of monitored RBs of the UE. Thus, the UE 104/base station 102 may comprise a CRS component 198, e.g., which may comprise/correspond to any of 708, 710, 712, 714, 716, 718, 1008, 1010, 1012, 1014, or 1016.

Figure 2:
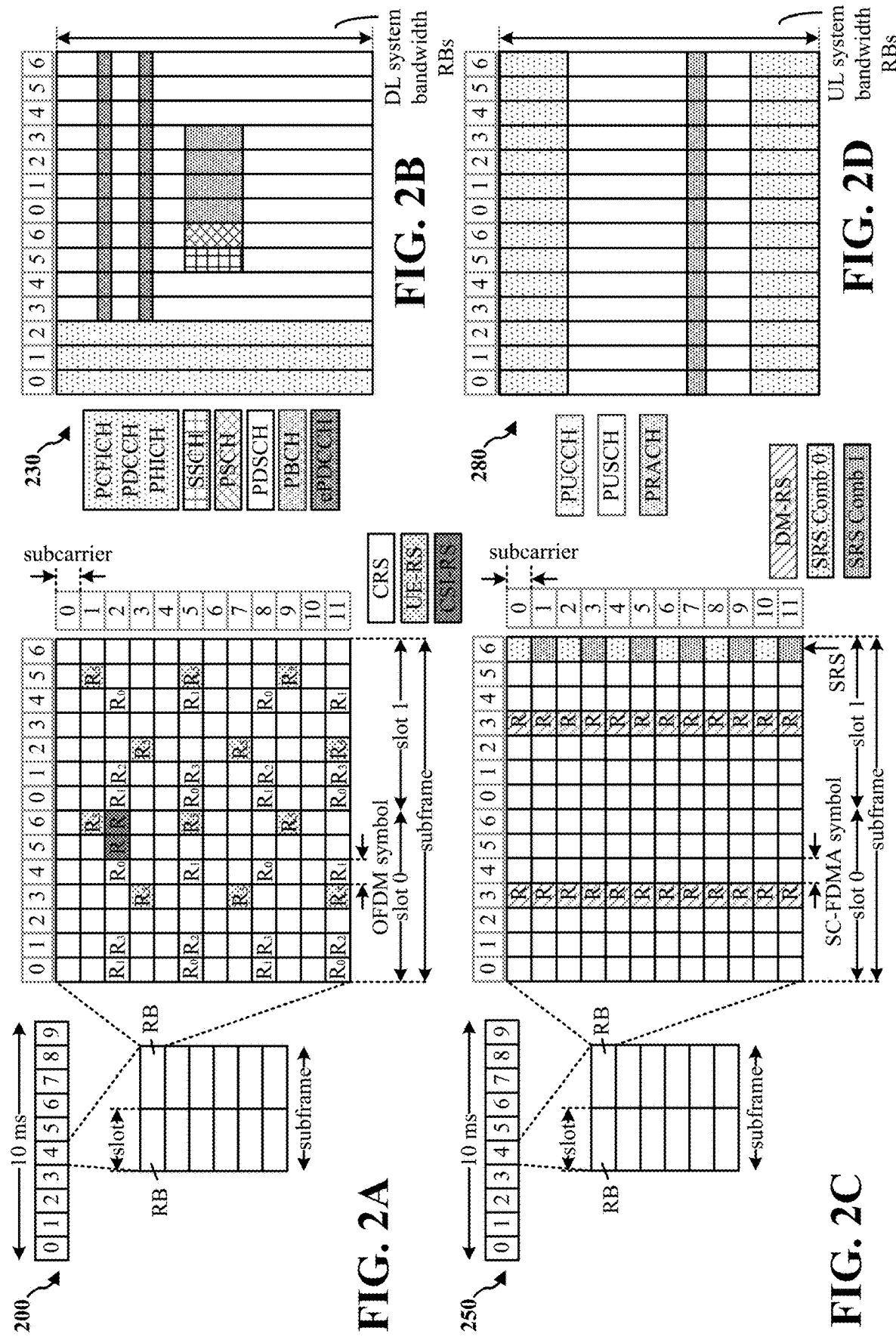
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
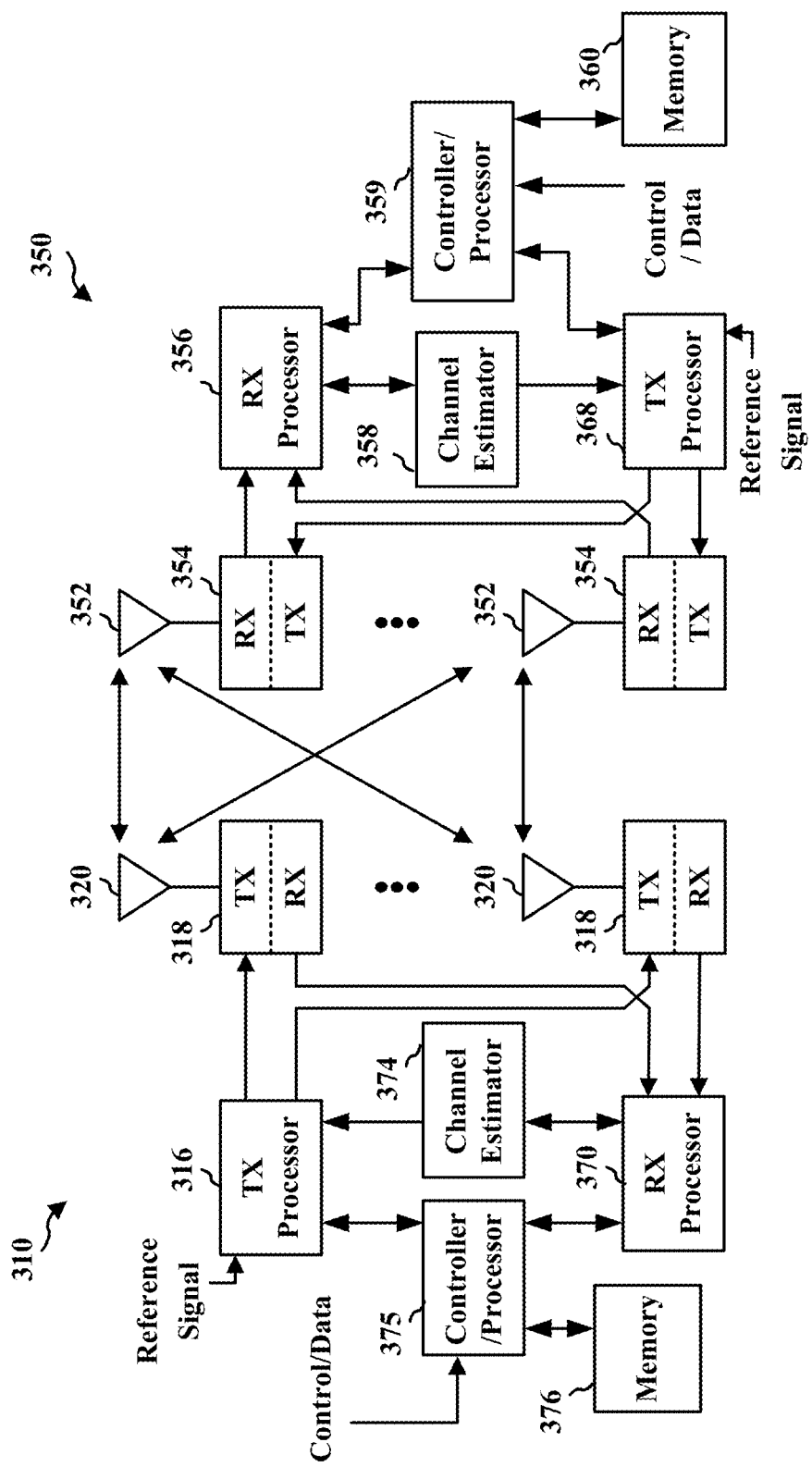
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. One example of such NB wireless communication is NB-IoT, which is limited to a single RB of system bandwidth, e.g., 180 kHz. Another example of NB wireless communication is eMTC, which is limited to six RBs of system bandwidth.

Multiple users may utilize the narrow band. While only some of the UEs may be active at a particular time, the NB communication should support such multi-user capacity.

Additionally, NB communication may need to provide for deep coverage, by accounting for devices in environments requiring different Coverage Enhancement (CE) levels. For example, some devices may need as much as 20 dB of CE, which results in greater uplink Transmission Time Interval (TTI) bundling, further limiting time resources.

NB-IoT communication may also involve a large cell radius, e.g., as much as approximately 35 km. Thus, the communication may involve a long delay, such as 200 µs, which may employ a long Cyclic Prefix (CP) length.

Similar challenges are involved with NB communication using eMTC, e.g., with Category 0, low cost MTC UEs. An MTC UE may be implemented with reduced peak data rates (e.g., a maximum of 1000 bits for a transport block size). Further, an MTC UE may be limited to supporting rank 1 transmissions and/or having 1 receive antenna. When an MTC UE is half-duplex, the MTC UE may have a relaxed switching timing (switching from transmission to reception or reception to transmission) compared to legacy or non-MTC UEs in accordance with the LTE standards. For example, a non-MTC UE may have a switching time on the order of 20 microseconds, while an MTC UE may have a switching time on the order of 1 millisecond.

MTC UEs may monitor DL control channels in the same way as non-MTC UEs, e.g., monitoring wideband signals, monitoring for both PDCCH and EPDCCH, etc. Additional MTC enhancements may be supported. Although MTC UEs operate in a narrowband, the MTC UEs may also be capable of operation in a wider system bandwidth (e.g., 1.4/3/5/10/15/20 MHz). For example, the MTC UEs may work in a system bandwidth of 1.4 MHz and may use 6 resource blocks (RBs). Further, the MTC UEs may have enhanced coverage up to 15 dB. Cat M1 supports 6 RB for PDSCH. Cat M2 supports 5 MHz for MTC PDSCH (up to 24 PRB).

Limited bandwidth UEs such as eMTC UEs may decode channels based on CRS. The CRS may be based on an LTE pilot and may be sent over the entire system bandwidth, as would occur in LTE. The UE may use CRS for channel estimation. UEs, such as eMTC UEs, may also be capable of operation in a wider system bandwidth (e.g., 1.4/3/5/10/15/20 MHz), but may not be able to monitor the entire system bandwidth for CRS. For example, a 1.4 MHz eMTC UE may be capable of monitoring a wider band CRS, e.g., up to 5 MHz, up to 10 MHz, up to 20 MHz, etc., but not capable of monitoring an entire system bandwidth. In order to more efficiently use system resources and to reduce power usage, it may be beneficial for a base station to reduce the bandwidth used to transmit CRS to such UEs.

Set of Monitored RBs

A portion of the system bandwidth may be defined as a "set of monitored RBs" that is monitored by a UE for CRS, the set of monitored RBs may comprise a monitored narrowband. The set of monitored RBs may be defined for a UE to determine the CRS RBs that it should monitor within a subframe.

For example, on subframes where the UE monitors only a PDCCH search space, the set of monitored RBs may comprise the RBs that are a part of PDCCH search space.

PDCCH transmissions happens within the PDCCH search space. Thus, the PDCCH search space is typically longer than the PDCCH transmission. The PDCCH search space could contain the CRS independent of whether PDCCH is transmitted or not. Alternately, in some cases only the subframes in and around the PDCCH search space that have an actual PDCCH may contain the CRS.

On subframes where UE monitors only PDSCH, the set of monitored RBs may comprise the RBs that are allocated for PDSCH.

The UE may be able to monitor both PDSCH and a PDCCH search space in subframes, e.g., when both the PDSCH and PDCCH search space are within the RB capability of the UE. On such subframes where UE is able to monitor both a PDSCH and a PDCCH search space, the set of monitored RBs may comprise the allocated PDSCH RBs, the PDCCH search space RBs, and any RBs between the allocated PDSCH RBs and PDCCH search space.

In some cases for a given PDSCH allocation, the UE may monitor PDCCH and PDSCH on some subframes and may monitor only PDSCH on other subframes. In this example, the same set of monitored RBs corresponding to PDCCH and PDSCH subframe may also be used as the set of monitored RBs for the subframes when only PDSCH is monitored. This may enable the UE to avoid having to retune due to a change in the RBs being monitored by the UE. If hopping is enabled, the use of the same set of monitored RBs in this example may be limited to subframes within the same hopping interval. A different set of monitored RBs may be used for subframes in different hopping intervals.

If a UE is monitoring a particular RB, the monitored RB may include all RBs in the narrow-band that includes the RB.

An MTC PDCCH (MPDCCH) may comprise a special type of PDCCH designed for bandwidth reduced operation. MPDCCH may be similar to ePDCCH and may carry common and UE specific signaling. Certain subframes might not contain an MPDCCH search space or PDSCH allocation. In such subframes, the monitored RBs may be defined in any of a number of ways. A similar set of monitored RBs may be used for invalid DL subframes or on guard subframes, e.g., for half duplex UEs.

In a first example, the set of monitored RBs may comprise only RBs around the center of the system bandwidth. For example, for eMTC communication limited to 6 RBs (e.g., as for Cat M1 UEs), the set of monitored RBs may comprise the center 6 RBs of the system bandwidth. For a UE having a different bandwidth capability, e.g., a capability of n RBs, the RBs may be the center n RBs of the system bandwidth. For example, for Cat M2 UEs that support up to 24 PRBs for PDSCH, the UE may assume a larger number of RBs (e.g. 12, 24, 25 PRBs) around the center than that assumed for Cat M1 UEs contain CRS. The number may also depend on the LTE system bandwidth. For 3 MHz system bandwidth, as only 12 RBs are in the system, a cat M2 UE may assume 12 for the monitored RBs for that case. In some cases (for example for 5 Mhz system bandwidth) the number of monitored RBs may be 25, because the system bandwidth is 25. A definition of a center 24 PRBs may lead to either just one edge RB being without mandatory CRS or having two edge RBs with half of a RB of mandatory CRS. In either case, the savings might not be much, while for other system bandwidths, the number of monitored RBs may be 24 as that may be sufficient even though the system bandwidth supports 25 RBs of CRS. In case the mandatory CRS transmission from gNB may lead to ½ RB of CRS on edge RBs. The UE may be allowed to assume a full RB contains CRS.

In a second example, the RBs of the set of monitored RBs may be based on the RBs of the set of monitored RBs in a last monitored subframe before the present subframe.

In a third example, the RBs of the set of monitored RBs may be based on the RBs of the set of monitored RBs on a next monitored subframe after the present subframe.

In a fourth example, the UE may refrain from monitoring CRS on such subframes.

In a fifth example, the set of monitored RBs may be based on a combination of the first through fourth examples. In this fifth example, the parameters used to determine the set of monitored RBs may change over time. For example, for M subframes after a last monitored subframe, the NB may be based on the second example that establishes the RBs of the set of monitored RBs based on the RBs of a last set of monitored RBs. Then, for N subframes before a next monitored subframe, the set of monitored RBs may be based on the third example that establishes the RBs of the set of monitored RBs based on the RBs of a set of monitored RBs in a next monitored subframe. For subframes falling between the M subframes after a last monitored subframe and N subframes before the next monitored subframe, the first example may be applied. Thus for subframes that are M+1 subframes after a last monitored subframe and N+1 subframes before a next monitored subframe, the set of monitored RBs may comprise only a center number of RBs. Different examples may be applied for invalid subframes, guard subframes, valid subframes not containing eMTC data for the UE, etc. The monitored subframes refers to the subframes being monitored for a PDCCH search space, a PDCCH allocation, and/or a PDSCH allocation. The values of M and N may be different for different channels and/or different UE categories, e.g., the values of M and N may be different for PDCCH, PDCCH search space, PDSCH allocation, etc. The monitored RBs aren't necessarily RBs that are being monitored by the UE, rather they are RBs that the UE may monitor for CRS or for other purposes as it desires. Also note that if a plurality of the conditions are satisfied, e.g., if a subframe is within M subframes of a monitored subframe and N subframes before the next monitored subframes, the monitored RBs may include a union of the monitored RBs of a previous monitored subframe, a next monitored subframe, and the center RBs. Alternately, rules may be defined which may limit monitored RBs in such cases. For example, the monitored RBs may be limited such that only the RBs of a next monitored subframe are considered, only previous monitored RBs are considered, etc. The rule may be a function of an amount of time between the current subframe, a last monitored subframe, and/or a next monitored subframe, as well as being based on the associated channels on the monitored subframe (e.g. are both PDCCH, is one channel PDCCH and the other PDSCH etc.).

A UE may be enabled to use CRS RBs around an MPDCCH search space when the UE is only monitoring MPDCCH—For example if the UE has a PDSCH or PUSCH allocation, the UE may not be expected to monitor MPDCCH that overlap in time with that allocation and is in a frequency location that the UE cannot simultaneously monitor. Hence, those RBs may not be part of the monitored RBs for CRS. Alternately, the UE may be enabled to use CRS RBs around an MPDCCH search space even though the UE may actually be expected to monitor PDSCH or transmit PUSCH at that time, because it may make the UE implementation robust to missed grants. This may be needed, e.g., when a UE misses a DL grant and monitors MPDCCH instead of PDSCH. This may be similarly applicable for missed UL grants and PUSCH for half duplex UEs, e.g., a UE may use CRS RBs around MPDCCH instead of PUSCH, e.g., when a UE misses an UL grant.

UL Gap

A UE may transmit PUSCH for an amount of time that requires the UE to retune in order to receive DL communication from the base station. The UE may run a frequency tracking loop (FTL) in order to retune to ensure that it is synchronized and ready to receive DL communication from the base station. When a UE has transmitted PUSCH for the length of time that requires the UE to retune and monitor a portion of time in DL for retuning, it may be referred to as an UL gap. In order to terminating an UL transmission earlier, a UE may be configured to monitor an early termination channel. For example, the UE may transmit a portion of the UL transmission, e.g., 25% of the UL transmission. The UE may be configured to hold the remaining transmission while the UE monitors for an ACK from the base station, e.g., on an early termination channel. If the UE receives the ACK on the early termination channel, the UE may refrain from transmitting repetitions of the UL transmission. If the UE does not receive the ACK on the early termination channel, the UE may continue the UL transmission and may transmit remaining repetitions. The monitoring of the early termination may be done in UL retuning gaps or may be provided for separately.

The set of monitored RBs in between the PUSCH transmission may be determined based on whether the UE is configured to monitor an early termination channel. For example, when a UE is configured to monitor the early termination channel, the set of monitored RBs may be based on the NB of the early termination channel. When a UE is not configured to monitor the early termination channel, the set of monitored RBs may be based on a center set of RBs, e.g., a center 6 RBs or a center number of RBs based on the bandwidth capability of the UE.

For a TDD configuration, when a UE is transmitting PUSCH in a given NB for UL communication and when there is no search space monitoring/PDSCH reception, the UE may assume that corresponding NBs are being monitored on the DL for CRS. Thus, the set of monitored RBs for monitoring CRS on the DL may be based on the NBs on which the UE transmits the PUSCH communication.

The set of monitored RBs may be based on parameters that enable a base station to minimize the number of CRSs that the base station needs to enable to meet the communication needs of different UEs, while giving the base station enough flexibility to extract hopping gains, etc. In selecting CRS RBs, a UE may select RBs that avoid channel estimation droop issues that may be seen on edge RBs with FFT. For example, in FIG. 5A, the UE may have a CRS bandwidth of 8 RBs and a set of monitored NBs that includes 4 RBs. If channel estimation is performed for RB 0 to RB 7, e.g., 8 RBs, while the monitored NB is from RB 2 to RB 5, a channel estimation droop may be experienced, the channel estimation may be bad for RB 0, RB 1, RB 6, and RB 7.

Figure 5B:
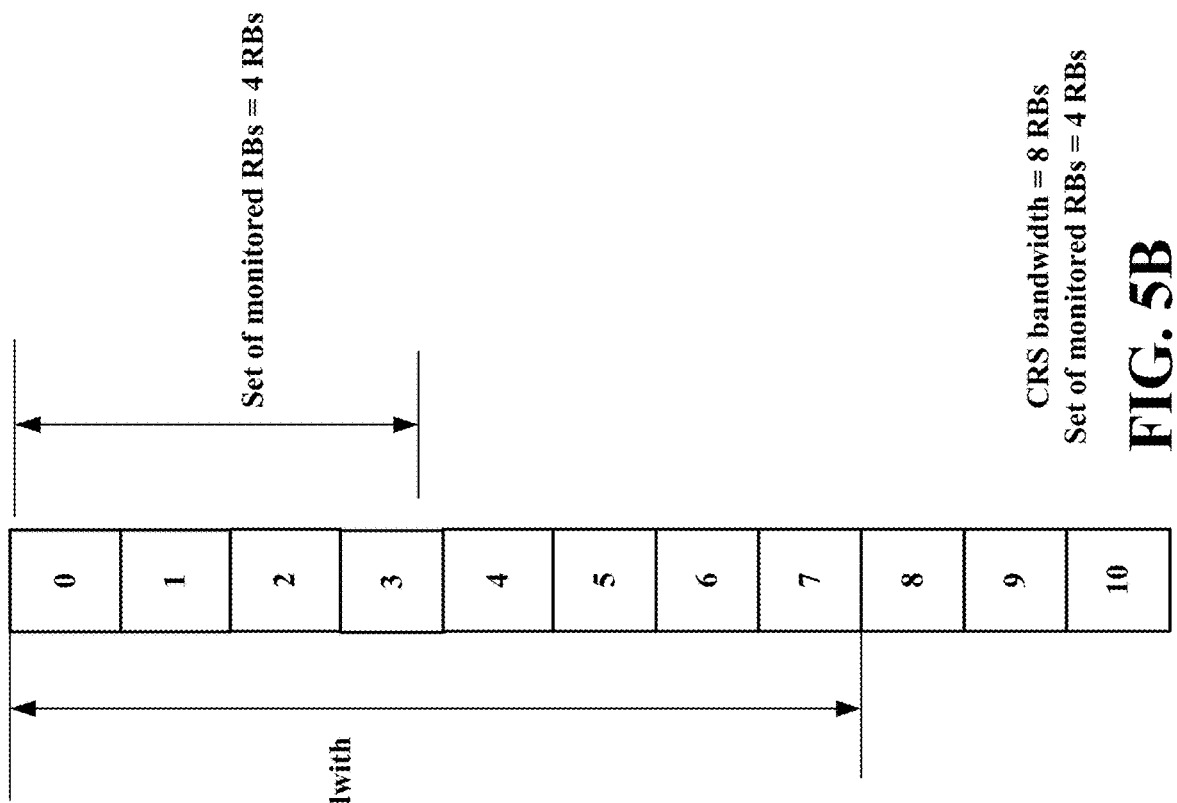
FIGS. 5A and 5B illustrate example relationships between a set of monitored RBs and a set of CRS RBs.
Figure 5A:
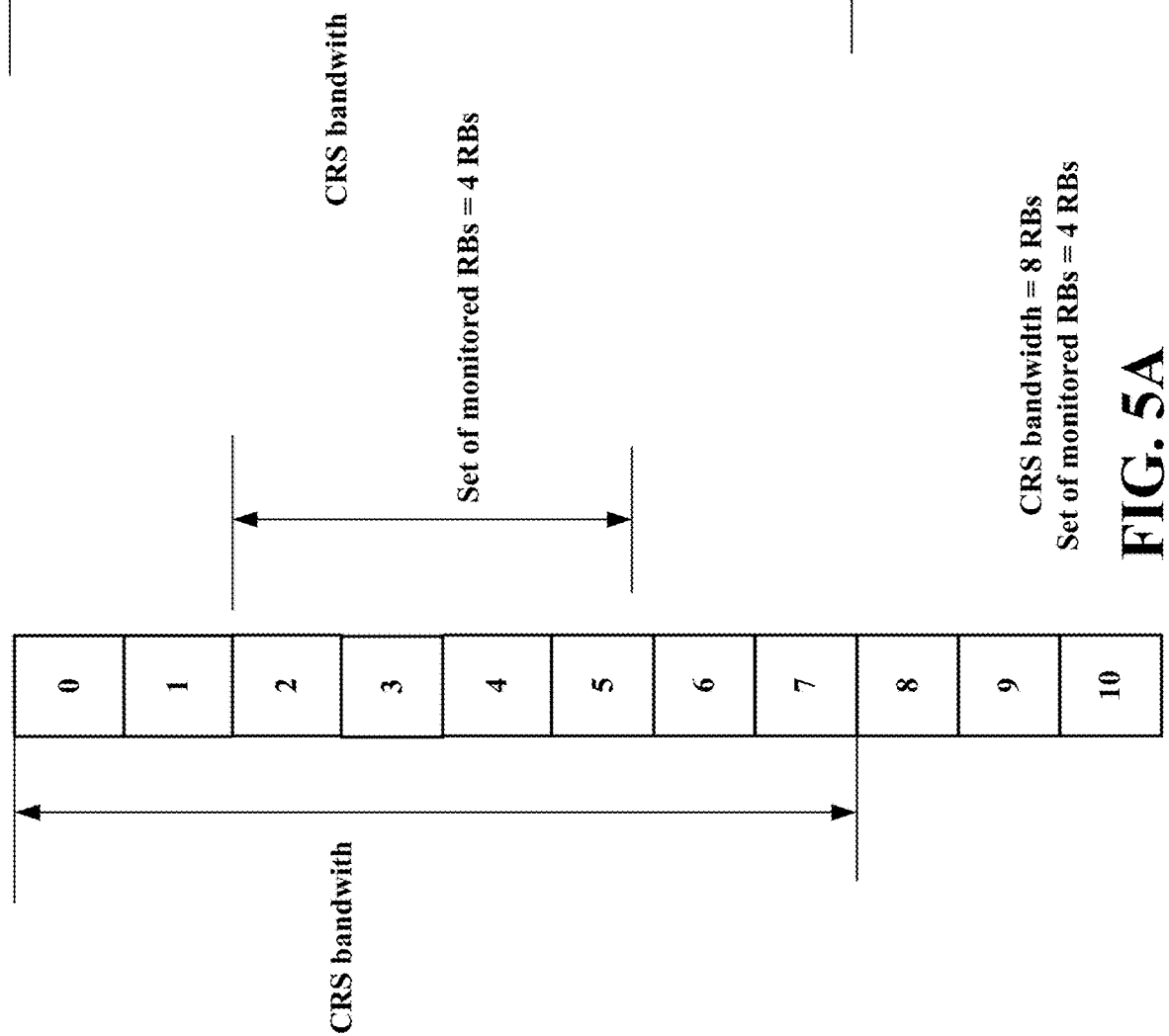

In order to avoid this problem of channel estimation droop, the UE may select the RBs for channel estimation such that at least one CRS tone is on a side of the allocation. For example, the RBs may be selected so that the first RB comprises at least one CRS tone or so that the last RB comprises at least one CRS tone. FIG. 5B illustrates an example where the set of monitored RBs is at a top side of the CRS bandwidth, e.g., beginning at RB 0. In another example, the monitored NB may be positioned such that the CRS bandwidth and the set of monitored RBs share a last RB. For example, in FIG. 5A, having the set of monitored RBs extend from RB 4 to RB 7 may also avoid channel estimation droop.

As well, the RBs for channel estimation may be selected to avoid having the DC in the set of monitored RBs. The RBs for channel estimation may be selected to avoid direct current (DC) in the allocated PDSCH RBs and/or the monitored PDCCH search space RBs. DC is a subcarrier that enables UEs to locate a center of a frequency band. In another example, the RBs may be selected such that the DC is a part of the set of monitored RBs, but not on RBs on which the UE is not receiving data. However, having the DC in the set of monitored RBs may still degrade channel estimation.

UE Signaling

The UE may signal information regarding the set of monitored RBs to the base station. For example, the UE may signal the maximum bandwidth that the UE uses for CRS.

Figure 4:
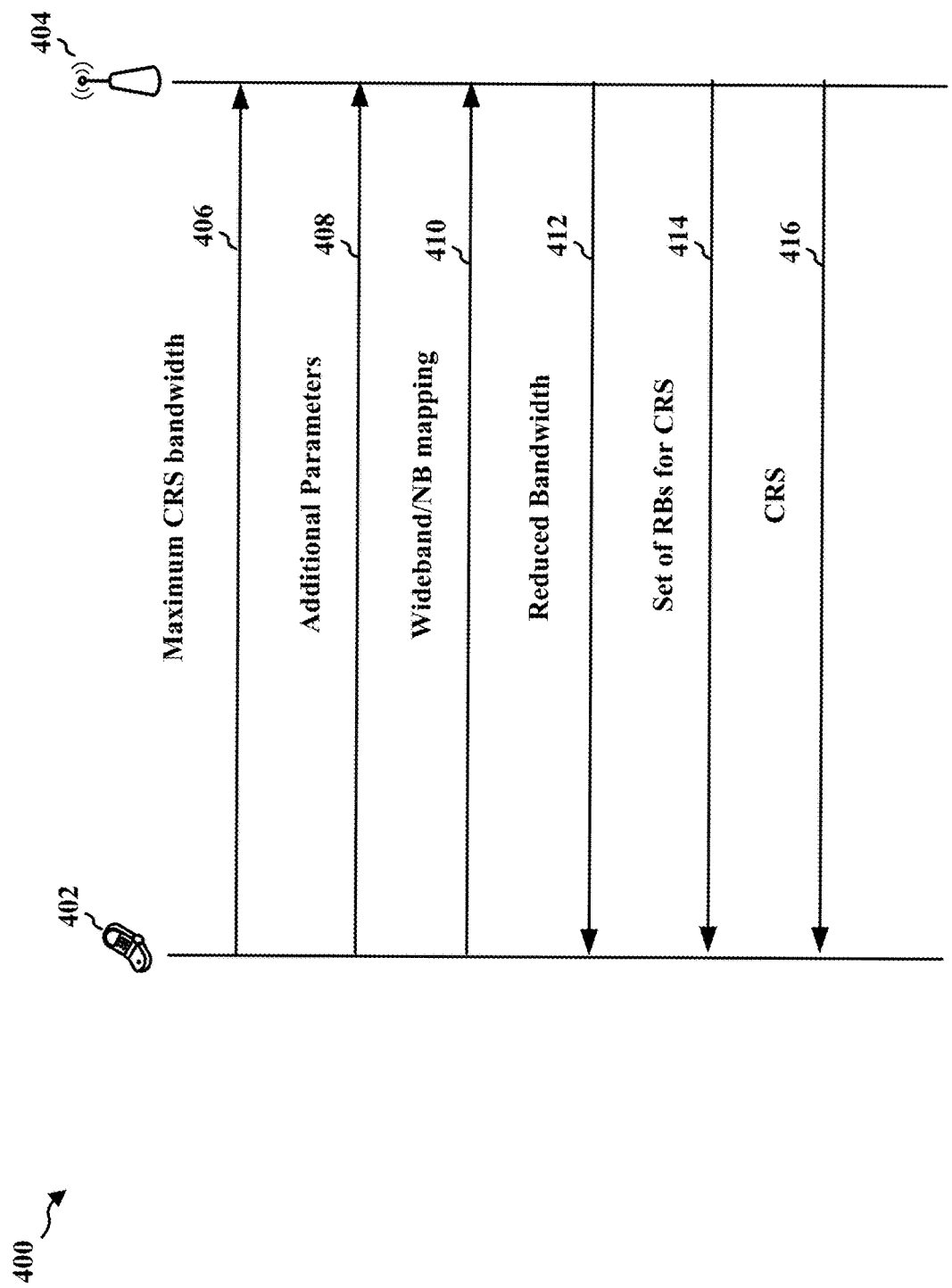
FIG. 4 illustrates a diagram of example signaling that may be transmitted between a UE and a base station.

For example, the UE may use a subset of the bandwidths allowed for LTE, e.g., 1.4 MHz, 5 MHz, 10 MHz, or 20 MHz, whereas LTE may also support 3 MHz and 15 MHz. FIG. 4 illustrates a diagram 400 of example signaling that may be transmitted between a UE 402 and a base station 404. As illustrated at 406, the UE may signal its maximum bandwidth for monitoring CRS to base station 404.

The CRS RBs may be a function of the set of monitored RBs. The function may be a predefined function. The UE may also signal additional parameters to the base station, e.g., at 408, and the base station may use the additional parameters from the UE to identify the specific RBs that the UE uses for CRS. The additional parameters from the UE may be jointly coded with the information that the UE signals to the base station regarding the maximum bandwidth for CRS, e.g., in order to reduce the number of bits required to signal this information to the base station.

In an example in which a UE indicates a 1.4 MHz bandwidth capability to monitor for CRS to the base station, e.g., corresponding to a 1.4 MHz eMTC Mode, the base station may transmit CRS for the UE only on the UE's set of monitored RBs. If the UE indicated a 20 MHz bandwidth capability to monitor for CRS to the base station, e.g., corresponding to any of 1.4/5/20 MHz eMTC Mode, the base station may use any available RBs to transmit CRS for the UE.

Determining CRS RBs from the UE's set of Monitored RBs

Multiple widebands may be defined within a system bandwidth. The widebands may be overlapping or non-overlapping in frequency. For example, a first wideband may comprise a top 10 MHz, a second wideband may comprise a middle 10 MHz, and a third wideband may comprise a bottom 10 MHz.

If the RBs of the set of monitored RBs defined for a UE are within one of the defined widebands, the UE may monitor for CRS only on that wideband. A predefined rule may be defined to identify a particular wideband in case the monitored RBs are fully contained in two widebands. Alternately, UE may be allowed to monitor any of the widebands in such cases. The UE may also monitor for CRS on N RBs around that wideband, where N may be equal to 0, 0.5, 1, 2, etc.

If the set of monitored RBs for a UE span multiple widebands of the defined widebands, the UE may determine the RBs to be monitored for CRS in a number of ways.

In a first example, the UE may assume that CRS may be present on any of the multiple widebands. For example, if the set of monitored RBs span two widebands, the UE may assume that the CRS is present on both widebands and may monitor NBs in both widebands for CRS.

In a second example, the UE may assume that the CRS will be present only on allocated NBs. Therefore, the UE may restrict the RBs for monitoring for CRS to NBs allocated to the UE.

In a third example, the UE may assume that the CRS will be present ±X RBs around the set of monitored RBs, but within the overall system bandwidth. Thus, the UE may monitor for CRS in for +X RBs and/or −X RBs around the set of monitored RBs, as long as the ±X RBs are within the system bandwidth. FIG. 13A illustrates monitored RBs, e.g., which may be monitored for PDCCH, PDSCH, MPDCCH, etc., as described supra. FIG. 13B illustrates that CRS may be present on the monitored RBs, e.g., illustrated as "monitored RBs and CRS" as well as ±X RBs around the monitored RBs. While FIG. 13B illustrates CRS in 1 additional PRB above and below the frequency of the monitored RBs, this is merely one example. CRS may be present for any number X of subframes above and below the frequency of the monitored RBs. X may be fixed, e.g., such as X=CRS bandwidth capability in # of RBs—# of RBs in the set of monitored RBs for the UE. This definition of X enables the UE to choose the placement of the center frequency based on the set of monitored RBs. In another example, X may be part of the UE signaling provided to the base station, e.g., at 408.

In a fourth example, the CRS may be assumed to be present in RBs N subframes before the set of monitored RBs and in RBs M subframes after the set of monitored RBs.

X and Y may be determined based on functions of an index of the set of monitored RBs, a number of the set of monitored RBs, and the CRS bandwidth capability of the UE. In one example, $X+Y=$CRS bandwidth capability in # RBs−# RBs in set of monitored RBs/2, $X,Y=$a ceiling or a floor of ((CRS bandwidth capability in # RBs−# RBs in set of monitored RBs)/2)

If X, Y, and the set of monitored RBs are such that the RBs for monitoring CRS reach an edge of the system bandwidth, the number of RBs on other end may be increased.

This fourth example may provide somewhat equal distribution on both sides of the set of monitored RBs. X and Y may be fractional, e.g., corresponding to ½ RB on either side of the set of monitored RBs. This may avoid the issue of channel estimation droop, as described in connection with FIG. 5A.

The third and the fourth examples may be used even without a definition of widebands.

Additional RBs for the CRS RBs may be added on either side of the set of monitored RBs equally, e.g., until a minimum number is reached, until an edge of the system bandwidth is reached, and/or until the CRS bandwidth capability is reached. Once one of those thresholds is reached, additional RBs may be added closer to a center RB.

For an example of a 1.4 MHz eMTC bandwidth case, a list of widebands, which may be overlapping, may correspond to the CRS bandwidth capability. Each wideband from the list of widebands may be associated with a corresponding set of monitored RBs, e.g. a narrowband. The set of monitored RBs may be a part of the wideband with which it is associated. The wideband may be selected to avoid channel estimation droop and/or to avoid having the DC within the set of monitored RBs.

A list of widebands and/or a mapping of each of the sets of monitored RBs to a corresponding wideband may be fixed. For example, the mapping may be specified or predefined. Alternately, a UE may signal to the base station which wideband it uses for each set of monitored RBs, and/or may signal to the base station the list of widebands. For example, as illustrated in FIG. 4, the UE may signal 410 a mapping of the widebands to the set of monitored RBs.

Figures 14A, 14B:
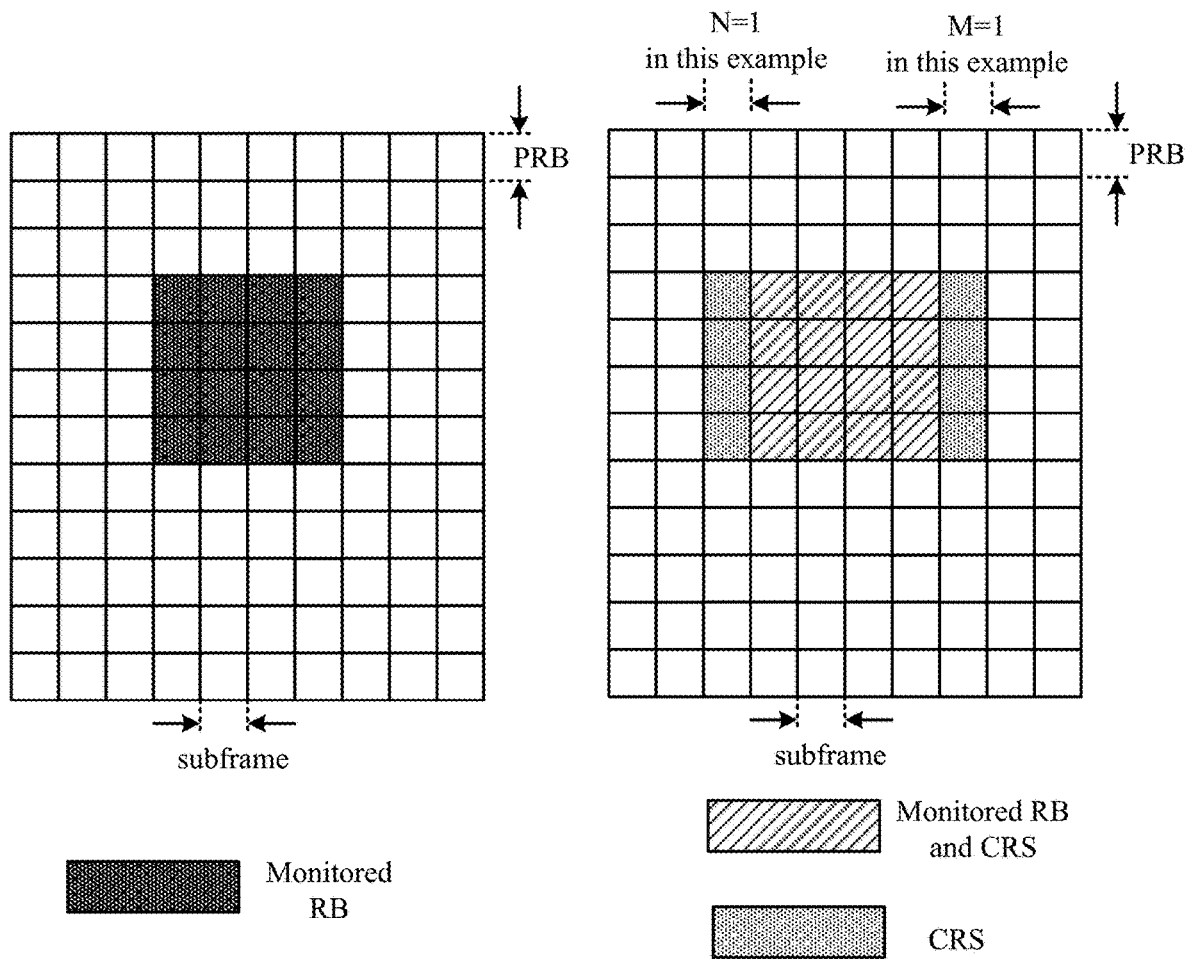
FIGS. 14A and 14B illustrate an example of resources for CRS.

The RBs before the set of monitored RBs may be referred to as a "warm up," and the RBs after the set of monitored RBs may be referred to as a "cool down." FIG. 14A illustrates monitored RBs, e.g., which may be monitored for PDCCH, PDSCH, MPDCCH, etc., as described supra. FIG. 14B illustrates that CRS may be present on the monitored RBs, e.g., illustrated as "monitored RBs and CRS" as well as in subframe(s) prior to and after the monitored RBs. While FIG. 14B illustrates CRS in 1 subframe before the monitored RBs and 1 subframe after the monitored RBs, this is merely one example. CRS may be present for any number N of subframes prior to the monitored RBs and for any number M after the monitored RBs.

Network Signaling

The network may providing signaling to the UE that influences the UE's determination of the set of RBs to monitor for CRS. For example, a base station may override the UE CRS bandwidth signaling by signaling a reduced bandwidth for monitoring CRS, e.g., at 412 in FIG. 4. In one example, a UE may request 20 MHz CRS bandwidth, or indicate a bandwidth capability of 20 MHz, but the network may ask it to use only 5 MHz of the UE's CRS bandwidth capability.

The reduced bandwidth signaled to the UE may be common CRS bandwidth for all UEs receiving CRS from the base station, e.g. a maximum CRS bandwidth supported by the network. Alternatively, the reduced bandwidth signaled to the UE may be UE specific, e.g., the reduced bandwidth may be set for the UE during RRC configuration.

In another example of network signaling, the base station may indicate a set of RBs that UE can use for monitoring CRS, e.g., 414 in FIG. 4. The indication may be transmitted to the UE in a broadcast message. The indicated set of RBs may be different than the system bandwidth. The indicated set of RBs may be explicitly communicated by the base station to the UE. For example, the indicated set may indicate a frequency range surrounding a reference frequency, e.g., ±5 MHz around the center frequency. In a different example, the set of RBs may be implicitly derived by the UE based on communicated parameters from the base station in combination with the set of monitored RBs. For example, the base station may indicate a frequency range with reference to the set of monitored RBs, e.g., that up to 10 MHz of CRS may be around the set of monitored RBs. The exact RBs/NBs containing CRS may be implicitly derived based on which set of RBs the UE is monitoring. The monitored RBs in this case may for example be the PBCH RBs and the network may signal a set of time and frequency resources (subframes around the subframes containing PBCH, RBs around the PBCH) where UE may assume CRS is present FIG. 4 also illustrates the CRS transmission 416 from the base station 404 to the UE 402.

Idle Mode/Connection Setup

At times before a UE is able to communicate its CRS bandwidth capability, any of a number of options may be used by the UE to determine CRS RBs. For example, the UE may need to determine CRS RBs while in an idle mode, when exiting an idle mode, or at connection setup. Example scenarios include serving cell measurements, paging reception, random access response (RAR), response/connection procedure. In these examples, the UE may only be monitoring a single narrowband.

In a first option the UE may be to use CRS in any part of the bandwidth. Thus, before a UE is able to communicate its CRS bandwidth capability, such as when the UE has been in an idle mode or prior to connection setup, the UE may use any part of the system bandwidth for the CRS RBs to monitor for CRS.

In a second option, the UE may only be allowed to use CRS RBs on the set of monitored RBs and a center set of RBs having a size based on the bandwidth capability of the UE. For example the center set of RBs may comprise a center 6 RBs. The center set of RBs may be used, e.g., even when the center RBs are not a part of the set of monitored RBs. The UE may also be allowed to use a few RBs on either side of the set of monitored RBs that fit within the bandwidth capability of the UE. The center set of RBs, e.g., the center 6 RBs may be used for decoding PBCH or for performing neighbor cell measurements, etc.

In a third option, the network may indicate to the UE a set of RBs that the UE can use for monitoring CRS. For example, the network may indicate the set of RBs in a broadcast message. The indicated set of RBs may be different than the system bandwidth. The indicated set of RBs may be explicitly communicated by the base station to the UE. For example, the indicated set may indicate a frequency range surrounding a reference frequency, e.g., ±5 MHz around the center frequency. In a different example, the set of RBs may be implicitly derived by the UE based on communicated parameters from the base station in combination with the set of monitored RBs. For example, the base station may indicate a frequency range with reference to the set of monitored RBs, e.g., that up to 10 MHz of CRS may be around the set of monitored RBs. The exact RBs/NBs containing CRS may be implicitly derived based on which set of RBs the UE is monitoring.

A combination of the approaches may also be used. For example, a UE may be allowed to use center a 6 RBs on all DL subframes. On some other subframes, the UE may be allowed to use a larger number of RBs, e.g., as signaled by the eNB in the broadcast message or implicitly determined by the UE on some subframes.

Mistaken PDCCH Decodes

The UE may be monitoring and attempting to decode PDCCH. Occasionally, the UE may detect a signal that the UE incorrectly assumes to be a PDCCH indicating a downlink grant for the UE. In this example, the UE would then expect a CRS to be received based on the assumed PDCCH. However, when the UE begins monitoring a PDSCH according to this mistaken downlink grant, the base station may not actually be transmitting CRS corresponding to those RBs, because the detected signal was not an actual downlink grant. This will cause a corruption of the channel estimate and tracking loops based on the UE measuring CRS when no CRS has actually been transmitted by the base station. A tracking loop may include a moving window of channel measurements that are averaged or combined. For example, a tracking loop may comprise a frequency tracking loop, a time tracking loop, etc.

The UE may reduce or avoid such channel estimate/tracking loop corruption by using at least one metric to determine whether a CRS is present or not before including measurements for the CRS in the channel estimate/tracking loop. In one example, the UE may use a PDSCH codeblock CRC pass or fail to determine whether a CRS is present and whether to include the CRS measurement in a channel estimate/tracking loop. In a second example, the UE may use a transport block (TB) cyclic redundancy check (CRC) pass or fail to determine whether a CRS is present and whether to include the CRS measurement in a channel estimate/tracking loop. In a third example, the UE may use an amount of CRS energy in a PDSCH in comparison to the amount of CRS energy in PDCCH RBs to determine whether a CRS is present and whether to include the CRS measurement in a channel estimate/tracking loop. In a fourth example, the UE may use information a PDCCH symbol energy and/or a vitterbi decoder metric to determine whether a CRS is present and whether to include the CRS measurement in a channel estimate/tracking loop. In a fifth example, the UE may use a symbol error count to determine whether a CRS is present and whether to include the CRS measurement in a channel estimate/tracking loop. In another example, the UE may use a combination of such metrics to determine whether the CRS is present and whether to include the CRS measurement in the channel estimate/tracking loop, e.g., using a combination of any of a PDSCH codeblock CRC, TB CRC pass/fail, CRS energy in PDSCH, CRS energy in PDCCH, PDCCH symbol energy/vitterbi decoder metrics, or symbol error count.

When the UE determines, using the metric(s) that a CRS is present, the UE may include the CRS measurement in the channel estimate/tracking loop. When the UE determines that a CRS is likely not present based on the metric(s), the UE may refrain from including the CRS measurement in the channel estimate/tracking loop. For example, the UE may use the metrics to reset any of a channel estimate, a power delay profile, a frequency tracking loop (FTL), a time tracking loop (TTL), etc. The reset may be performed by initializing these variables to the value prior to the start of the PDSCH. In another example, the reset may be performed after PDSCH, and the CRS measurement can be acquired again.

In order to reduce the problem of a UE unable to perform accurate CRS measurements, gaps or spacing may be provided between PDSCH repetitions when there are larger repetition numbers, which may enable a UE to perform tracking/CRS measurements during the spacing between PDSCH decodes. For example, for repetitions about a threshold, a gap or spacing may be employed. In one example, a spacing may be provided after 256 PDSCH repetitions.

UE-RS Based Communication

Another example in which a CRS may not be present for measurement involves UE-RS based communication. For example, some transmission modes may be UE-RS based, and therefore UE would use UE-RS signals for channel estimates instead of CRS. For example, transmission mode 9 or transmission mode 10 may involve PDSCH decoding that is based on UE-RS rather than CRS. As another example, eMTC PDCCH decoding is UE-RS based. In this example of UE-RS base communication, a UE may not need to monitor CRS on the PDCCH/PDSCH RBs in order to decode PDCCH/PDSCH. CRS is only needed for tracking loop updates and CQI reports etc. The UE may instead be able to subsample CRS by measuring CRS on a subset of subframes rather than on each subframe.

The UE may rely on MPDCCH narrowbands for a CQI report, for example.

Figure 12:
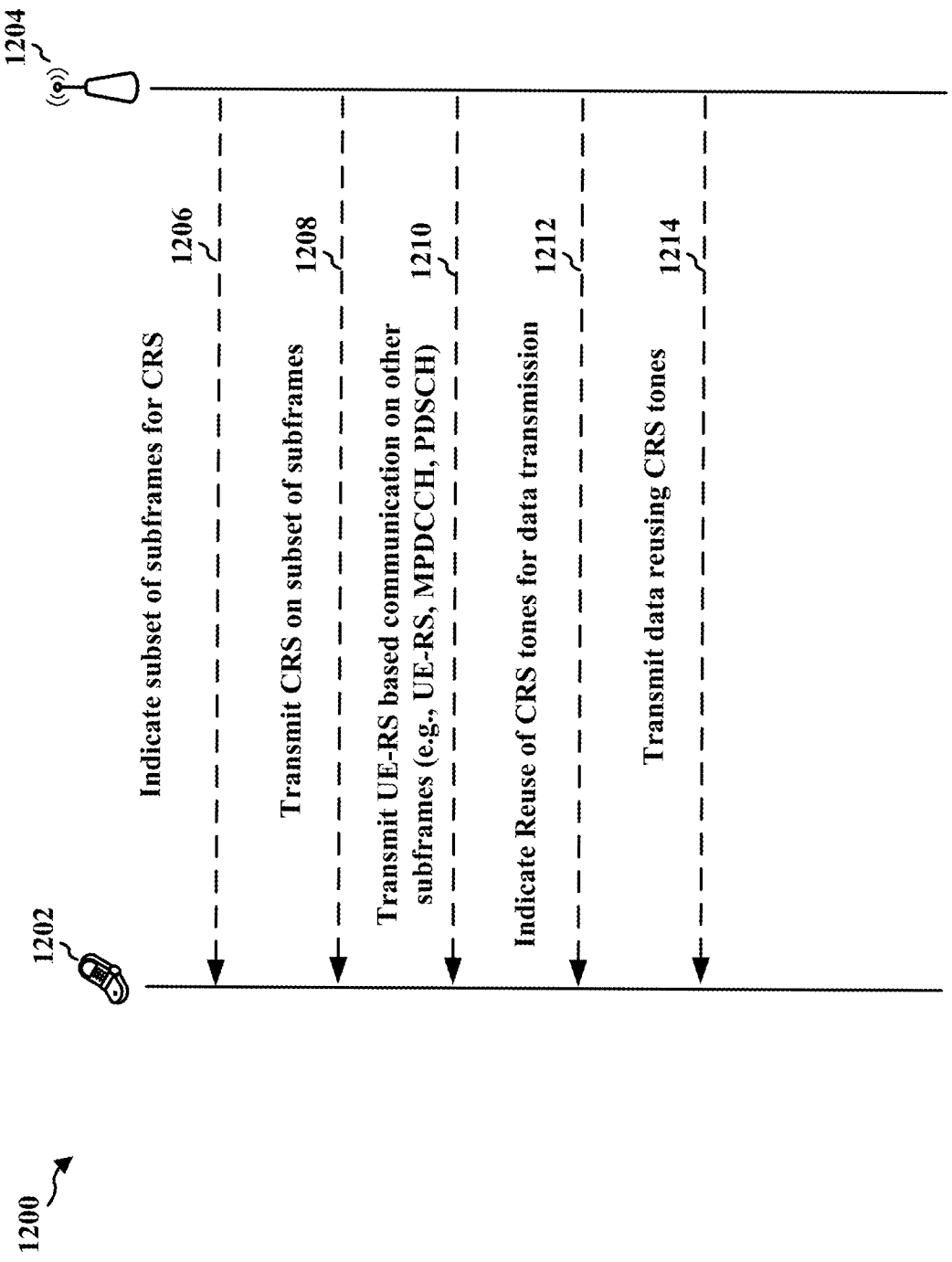
FIG. 12 illustrates a diagram of example signaling that may be transmitted between a UE and a base station.

However, subsampling CRS may be problematic for tracking loops. In order to avoid problems with the tracking loops, a network may signal the UE with an indication when the PDCCH/PDSCH also has a CRS, e.g., as illustrated in FIG. 12. FIG. 12 illustrates examples of signaling between a base station 1204 and a UE 1202 in order to assist the UE in measuring CRS. For example, the base station may indicate a subset of subframes in which CRS is transmitted at 1206. The indication may be signaled to the UE in DCI, in a broadcast message, etc. The base station may then transmit CRS on the indicated subset of subframes at 1208. The base station 1204 may transmit UE-RS based communication in these and the other subframe at 1210, e.g., MPDCCH, PDSCH, UE-RS, etc. In a second example, the CRS presence/absence may be a function of a number of repetitions. For example, a particular repetition number of the PDSCH may have an associated CRS. In a third example, spacing or a gap may be provided between PDSCH repetitions for large PDSCH repetitions, e.g., above 256 repetitions. For example, a gap for a CRS may be provided every 64 subframes of PDSCH repetitions. The number of subframes or repetitions before a gap may be defined or may be configurable by the base station. The gaps/spacing may enable a UE to run tracking loops, etc. in between PDSCH decoding.

In these examples when the communication is UE-RS based rather than CRS based, the CRS tones may be reused by the base station for PDSCH data, e.g., as illustrated at 1214. The base station may provide an indication 1212 to the UE regarding whether the base station will reuse the CRS tones. For example, the base station may signal an indication to the UE that assists the UE in determining whether to rate match around the CRS tones or to include the CRS tones as data tones. The indication from the base station may be signaled to the UE via DCI, higher layer signaling, etc.

Alternatively, the CRS presence may be the same regardless of a transmission mode employed by a base station. For example, there may be no CRS in MBSFN frames, and the CRS presence in non-MBSFN frames may be according to the description supra.

CRS Presence on MPDCCH RBs

As MPDCCH may be decoded using UE-RS rather than CRS, a CRS need not be present associated with MPDCCH. However, UE CQI Reports may be based on MPDCCH RBs. Also, UE tracking loops, etc. may need to run. Such tracking loops typically use CRS. In order for a UE to know whether a CRS is present with MPDCCH so that the UE may perform accurate channel estimates/tracking loops, the network may indicate subframes or RBs in which the UE may assume that CRS is present. For example, a base station may signal a set of subframes and/or a set of RBs using bitmap, a subframe number, a number of subframes, a periodicity, etc.) that enables the UE to determine the RBs/subframes in which a CRS should be present. For the subframes/RBs that are not indicated by the base station, the UE may mute CRS measurements, e.g., may refrain from measuring CRS or refrain from using the CRS measurement for channel estimation/tracking loops.

Gaps may be provided in the MPDCCH search space in some cases, e.g., based on a threshold number of repetitions (Rmax) to allow the UE to update tracking loops/obtain CQI, etc. using CRS/CSI-RS.

With mix of legacy and new UEs, a network may mitigate any impact to legacy UEs, e.g., by sending CRS on all subframes around the MPDCCH search space when sending PDCCH for a legacy UE that may not be aware of CRS muting and refraining from sending CRS for at least one MPDCCH, e.g., according to any of the examples described supra. For example, some CRS may be muted by the network when sending PDCCH for new UEs that may be aware of the CRS muting.

CRS BW as Function of Channel/Allocation

The number of RBs around an allocation that UE can use for CRS may be a function of the channel and/or allocation size.

For example, a UE may limited to monitoring monitor X RBs on either side of the MDPCCH RBs or the MPDCCH NB.

In another example, for PDSCH, a UE may use different amounts of bandwidth for CRS, e.g., up to the full UE bandwidth capability, depending on a size of the PDSCH allocation. For example, a UE with a CRS bandwidth capability of 5 MHz, may use a CRS bandwidth below the capability, e.g., 3 MHz, when the PDSCH allocation is within 1 narrowband. When the PDSCH allocation is larger than 1 narrowband, the UE may use an increased bandwidth capability, e.g., the full CRS bandwidth capability of 5 MHz.

In another example, the CRS bandwidth for the UE may be signaled to the UE. For example, the CRS BW that UE can use for PDSCH may be signaled to the UE from the base station in DCI.

Measurements

For CRS measurements, the UE may be constrained to a set of RBs or to a particular subframe, e.g., based on the description supra.

For example, the UE may be constrained to using the center 6 RBs for CRS. This example may require gaps/spacing between PDSCH/MPDCCH transmissions for the UE to be able to obtain these CRS measurements.

In a second example, the UE may use a constrained set of RBs or subframes depending on whether PDSCH or MPDCCH are present. The assumption may be based on any of the examples described in connection with CRS presence on MPDCCH RBs and/or CRS presence on PDSCH RBs, e.g., based on any of signaling from the base station regarding the presence/absence of CRS, a function of repetitions, a gap provided between repetitions, etc.

The UE may need to "prune out" the false alarms, or mistaken CRS, since CRS measurements may be critical. The UE may prune out mistaken CRS, e.g., using any of the metrics described supra for mistaken PDCCH decoding.

Aspects described in connection with CRS may similarly be used for CSI feedback. For example, the UE may perform the CRS measurements in the subframes/subbands that are assumed to have CRS for CSI feedback.

CRS Presence on Neighboring Subframes of Monitored Subframe

In one example, a UE may monitor for CRS for X RBs around the allocated narrowbands. In one example, X=0.5 RB may be sufficient. However, with hopping, the channel estimation or other measurements might not be accurate across due to filtering across subframes.

For example, in a first subframe SF1, MPDCCH may be transmitted on first narrowband, e.g., NB 8. In a second subframe SF2, the MPDCCH may be transmitted on a second narrowband, e.g., NB 2. Therefore, the CRS will be present only around the first narrowband, NB 8, in the first subframe SF1. Similarly, the CRS will only be present around the second narrowband, NB 3, in the second subframe SF2. For channel estimation, a UE uses bandwidth for channel estimation and averages the channel estimation measurement of the first subframe SF1 and the second subframe SF2 across the frequency for decoding the second subframe SF2. This may degrade performance significantly. For example, this will cause the UE to assume that CRS is transmitted in NB 3 in SF1 when CRS is actually only transmitted on NB 8 in SF1. Although the severity of the degradation may be reduced with noise weighted averaging, it remains important for the UE to perform a more accurate channel estimation.

In order to solve the problem of channel estimation accuracy when hopping, when a UE monitors RB X on subframe N for CRS, the UE may assume that subframes N−M to N−1 have CRS on RB X. Thus, in the example, above, for the second subframe SF2, the UE may assume that the first subframe SF1, where SF1=SF2-1, has CRS on RB X. For example, the UE may measure CRS across all frequencies of each subframe on which the UE hops. Thus, for SF1 and SF2, the UE may measure both NB 3 and NB 8.

Figure 6:
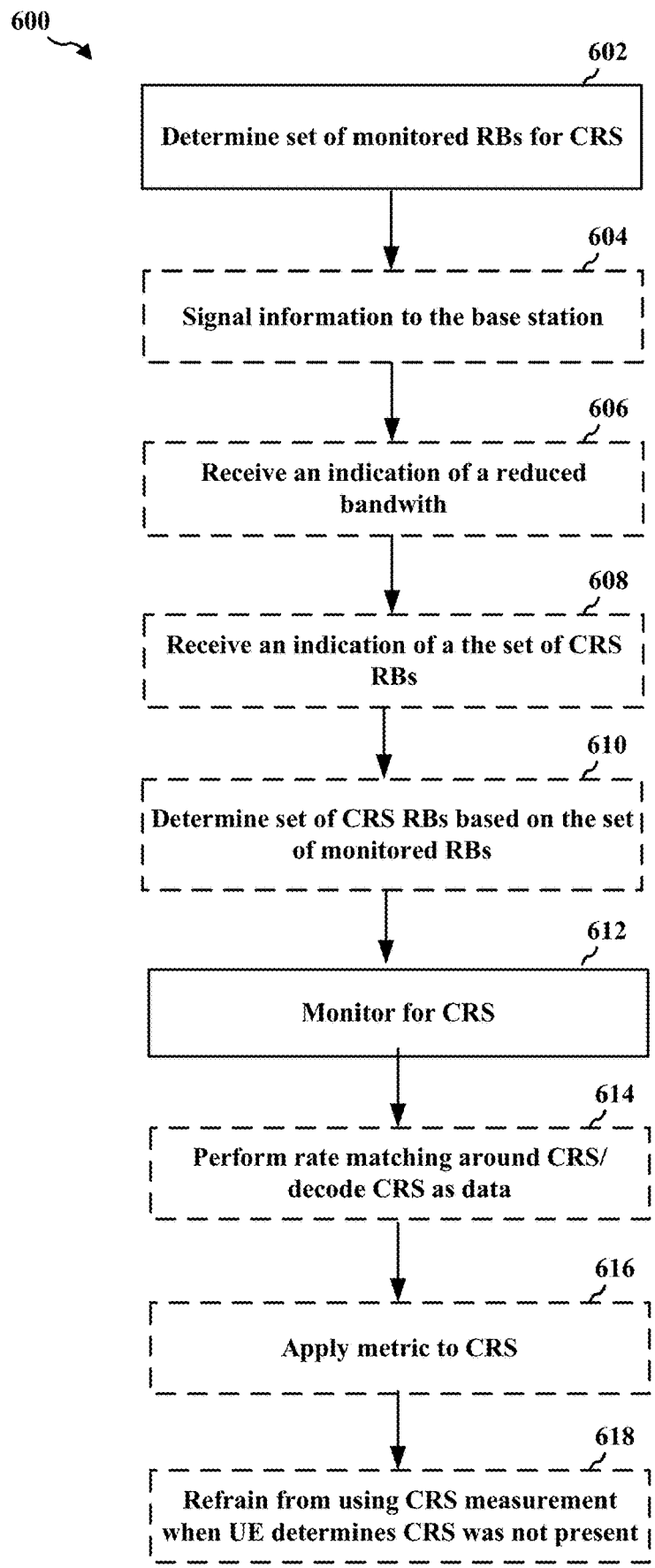
FIG. 6 is a flowchart of a method of wireless communication.

FIG. 6 is a flowchart 600 of a method of wireless communication. The method may be performed by a UE (e.g., the UE 104, 350, 1050, the apparatus 702/702') communicating wirelessly with a base station (e.g., base station 102, 750, the apparatus 1002, 1002'). At 602, the UE determines a set of monitored resource blocks on the subframe for monitoring for CRS from a base station. At 612, the UE monitors for the CRS from the base station based on the set of monitored resource blocks on the subframe. The UE may refrain from monitoring the CRS on other RBs on the subframe.

The set of monitored resource blocks, determined at 602 and monitored at 612, may comprise a first set of resource blocks allocated for a PDCCH search space. The set of monitored resource blocks may comprise a second set of resource blocks allocated for a PDSCH transmission. The set of monitored resource blocks may comprise a combination of a first set of resource blocks allocated for a PDCCH search space and a second set of resource blocks allocated for a PDSCH transmission. Thus, the set of monitored resource blocks on subframes containing one or more of a downlink control channel (e.g., a PDCCH transmission, a PDCCH search space, or a PBCH) or a downlink data channel (e.g., PDSCH) may comprise at least one of a first set of resource blocks allocated for a PDCCH or a PDCCH search space and a second set of resource blocks allocated for a PDSCH transmission on the subframe.

The monitored RBs may include all RBs in a narrowband that include RBs allocated to the PDCCH transmission, PDCCH search space or PDSCH allocation. The monitored RBs may include all RBs in between the PDCCH search space and PDSCH allocation when the UE is expected to monitor both the PDCCH search space and the PDSCH on the same subframe.

The set of monitored resource blocks for monitoring the CRS may further comprise a third set of resource blocks comprising resource blocks around the first set of resource blocks allocated for the PDCCH, the PDCCH search space, or the PDSCH transmission. For example, the third set of resource blocks may include a group of one or more resource blocks adjacent to the PDCCH, the PDCCH search space, or the PDSCH transmission in time and/or frequency, as described in connection with FIGS. 13A, 13B, 14A, and 14B. For example, the set of monitored resource blocks may further comprise a third set of resource blocks based on the allocated RBs for PDCCH/PDCCH search space/PDSCH in a subsequent subframe if the subframe is within N subframes of the subframe containing the PDCCH search space, PDCCH, or PDSCH transmission (e.g., which may be referred to as a warm up), wherein N is an integer greater than zero. The set of monitored resource blocks on a subframe for monitoring CRS may further comprise a fourth set of resource blocks determined based on the allocated RBs for PDCCH, PDCCH search space, or PDSCH on a previous subframe if the subframe is within M subframes after the subframe containing the PDCCH search space, PDCCH, or PDSCH transmission (e.g., which may be referred to as a cool down), wherein M is an integer greater than zero. The integer M, N may depend on the channel (e.g., PDCCH, PDCCH search space, PDSCH, etc.) and/or the UE bandwidth capability. FIG. 14B illustrates an example in which the monitored resource blocks comprise N resource blocks before the PDCCH/MPDCCH/PDSCH and M resource blocks after the PDCCH/MDCCH/PDSCH. While FIG. 14B illustrates an example in which M=1 and N=1, M and N may be any integer number greater than zero. The third set of resource blocks may span a same frequency as at least one of the first set of resource blocks allocated for the PDCCH transmission or the PDCCH search space and the second set of resource blocks allocated for the PDSCH transmission on the subframe in a subsequent subframe, and the fourth set of resource blocks may span the same frequency as at least one of the first set of resource blocks allocated for the PDCCH transmission or the PDCCH search space and the second set of resource blocks allocated for the PDSCH transmission on the subframe in a prior subframe, e.g., as described in connection with FIG. 14B.

The set of monitored resource blocks may further comprise a fifth set of resource blocks comprising X, Y resource blocks around the first set of resource blocks allocated for the PDCCH search space or second set of resource blocks allocated for the PDSCH transmission, wherein X is an integer greater than zero. For example, as described in connection with FIG. 13B, the monitored set may comprise X resource blocks in an adjacent higher frequency range than the first set of resource blocks or the second set of resource blocks and Y resource blocks in an adjacent lower frequency range than the first set of resource blocks or the second set of resource blocks. X, Y may depend on any of a type of channel (e.g., PDCCH/PDSCH/PBCH, etc.), a UE category (Cat M1/Cat M2/Cat M3), a system bandwidth, and/or the allocated RBs/narrowbands.

The subframe may be a valid subframe for eMTC operation. The subframes considered for checking the M and N subframe conditions may only be valid downlink subframes for eMTC operation. The subframes considered for checking the M and N subframe conditions may comprise all downlink subframes.

On subframes that satisfy both the M subframes after and N subframes before condition, the monitored RBs may be a union of RBs form both the sets of monitored RBs. Alternately, the monitored RBs may be only one, single set of monitored RBs. This may be based on timing from the prior monitored subframe and subsequent monitored subframe and the channel associated with the prior monitored subframes and subsequent monitored subframe.

In an example involving a subframe without a PDCCH search space or an allocation for a PDSCH transmission, the set of monitored resource blocks may be based on any of a number of alternatives. In a first alternative, the set of monitored resource blocks may be based on a center set of resource blocks having a size based on a bandwidth capability of the UE and the system bandwidth. The set of monitored RBs may be based on a set of resources blocks around the center frequency on a subset of subframes where the number of RBs and the subset of subframes is signaled by the gNB or determined implicitly at the UE. For example, a Cat M1 UE may monitor the center 6 RBs for CRS. A Cat M2 or higher UE may monitor the center 24 or 25 RBs for CRS. The selection may be performed based at least in part on a total system bandwidth. The UE may determine the set of monitored resource blocks as a function of time. For example, one alternative may be selected for a first M subframes after a last monitored subframe, e.g., a last subframe involving a PDCCH search space or an allocation for a PDSCH transmission. Another alternative may be selected for N subframes prior to the next monitored subframe.

The monitored RBs for subframes in between a PUSCH transmission and/or repetitions for a single transport block (TB) may be based on a transmission narrowband used by the UE for the PUSCH. The monitored RBs may include the narrowbands allocated for PUSCH if the duplexing scheme is time division duplexing (TDD).

When the UE is configured to monitor an early termination channel, the set of monitored resource blocks may be based on a second set of resource blocks for the early termination channel. When the UE is not configured to monitor the early termination channel, the set of monitored resource blocks may be based on a center set of resource blocks having a size based on a bandwidth capability of the UE.

At 604, the UE may signal information to the base station regarding a bandwidth used to monitor for the CRS, wherein the information comprises a maximum bandwidth for monitoring for the CRS. The information may further comprise additional parameters that identify the set of resource blocks that the UE uses to monitor CRS.

At 610, the UE may determine a set of CRS resource blocks based on the set of monitored resource blocks.

When the set of monitored resource blocks is within a single non-overlapping wideband, the UE may monitor for the CRS on the wideband and on a number of resource blocks around the wideband.

When the set of monitored resource blocks spans multiple non-overlapping widebands, the set of CRS RBs may be based on any of a number of assumptions. The set of CRS RBs may be based on an assumption that the CRS is present on the multiple widebands, an assumption that the CRS is present only on allocated resource blocks, an assumption that the CRS is present on any resource block that fits within a CRS bandwidth capability of the UE when monitored along with the set of monitored resource blocks, or an assumption that the CRS is present within a second number of resource blocks before the set of monitored resource blocks and a third number of resource blocks after the set of monitored resource blocks, wherein the second and third number of resource blocks are a fixed function of the smallest and largest resource block index of the set of monitored resource blocks.

For a set of a plurality of widebands within a system bandwidth, the set of monitored resource blocks may be associated with one of the plurality of widebands.

The UE may receive an indication at 606 of a reduced bandwidth below a bandwidth capability of the UE. The set of CRS resource blocks determined at 610 may be based on the reduced bandwidth.

At 608, the UE may receive an indication of the set of CRS resource blocks from the base station. The set of CRS resource blocks determined at 610 may be based on the indication received at 608.

The set of CRS resource blocks determined at 610 may be based on at least one of a system bandwidth, the set of monitored resource blocks and a center set of resource blocks having a size based on a bandwidth capability of the UE, or a network indication of the set of CRS resource blocks.

In order to avoid false measurements for CRS, the UE may apply a metric to a CRS measurement to determine whether the CRS was present at 616. Then, at 618, the UE may refrain from using the CRS measurement for at least one of channel estimation or a tracking loop when the UE determine that the CRS was not present.

Monitoring for the CRS, at 612, may comprise sampling the CRS on a subset of subframes when receiving UE-RS based communication. The subset of subframes may be based on at least one of an indication from the base station, a number of repetitions of the UE-RS based communication, or a gap provided between transmissions of the UE-RS based communication. The UE may perform at least one of rate matching around CRS tones or decoding the CRS tones as data depending on an indication from the base station at 614.

A bandwidth of the set of monitored resource blocks, e.g., at 612 may be a function of at least one of a channel and an allocation. For example, when receiving MPDCCH, the bandwidth of the set of monitored resource blocks may be based on a number of surrounding resource blocks on either side of the MPDCCH (e.g., in frequency and/or time). Resource blocks surrounding on either side of the MPDCCH may comprise adjacent resource blocks at an adjacent higher frequency range, adjacent resource blocks at an adjacent lower frequency range, resource blocks in an adjacent subframe prior to the MPDCCH, and/or resource blocks in an adjacent subframe subsequent to the MPDCCH, e.g., as described in connection with the example of CRS in FIGS. 13A, 13B, 14A, and 14B.

In another example, when receiving PDSCH, the bandwidth of the set of monitored resource blocks may be based on a size of the allocation for the PDSCH. The UE may use a first bandwidth (e.g., first frequency range) when the PDSCH comprises a smaller frequency allocation and uses a second, larger bandwidth (e.g., second frequency range) when the PDSCH comprises a larger frequency allocation. The second, larger bandwidth may comprise a CRS bandwidth capability of the UE.

The set of monitored resource blocks, e.g., at 612, may comprise a number of resource blocks surrounding an allocation, wherein the UE monitors for the CRS across all frequencies on which the UE hops in multiple subframes. Resource blocks surrounding the allocation may comprise adjacent resource blocks at an adjacent higher frequency range, adjacent resource blocks at an adjacent lower frequency range, resource blocks in an adjacent subframe prior to the allocation, and/or resource blocks in an adjacent subframe subsequent to the allocation, e.g., as described in connection with the example of CRS in FIGS. 13A, 13B, 14A, and 14B.

Figure 7:
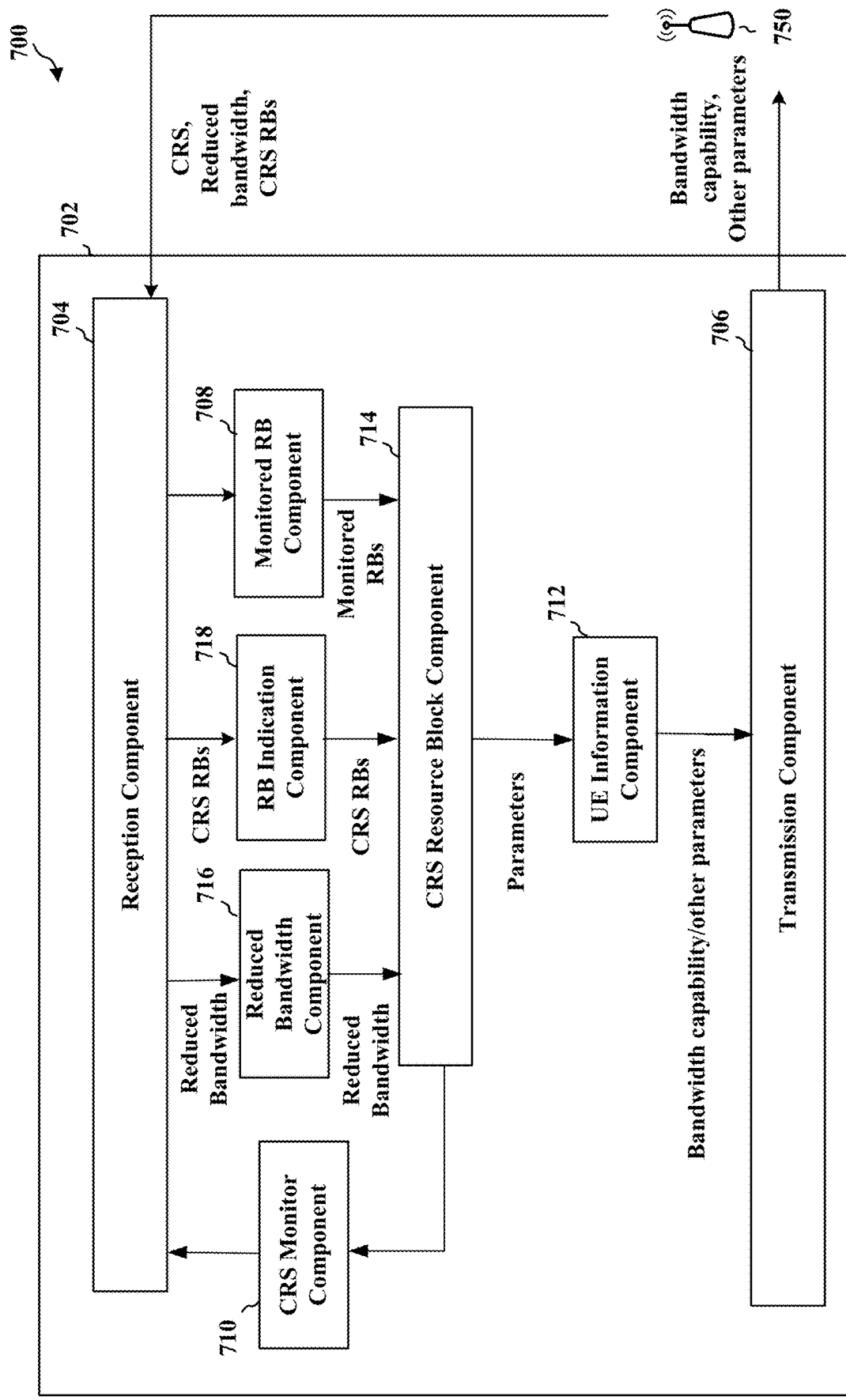
FIG. 7 is a conceptual data flow diagram illustrating the data flow between different means/components in an exemplary apparatus.

When the UE hops from a first narrowband in a first subframe to a second narrowband in a second subframe, the UE may be allowed to monitor both the first narrowband and the second narrowband in both the first subframe and the second subframe, e.g., as part of the monitoring for the CRS at 612. When a UE hops from a first narrowband in a first subframe to a second narrowband in a second subframe, the UE may be allowed to monitor either the first narrowband or the second narrowband or both based on whether it is the first subframe or the second subframe, whether the subframe contains a PDCCH or PDSCH or whether it is a subframe prior or after a subframe containing start/end of PDCCH/PDSCH FIG. 7 is a conceptual data flow diagram 700 illustrating the data flow between different means/components in an exemplary apparatus 702. The apparatus may be a UE (e.g., UE 104, 350, 1050). The apparatus includes a reception component 704 that receives DL communication from a base station 750, including CRS, and a transmission component 706 that transmits UL communication to base station 750. The apparatus may include a monitored RB component 708 configured to determine a set of monitored resource blocks for monitoring for CRS from a base station and a CRS monitor component 710 configured to monitor for the CRS from the base station based on the set of monitored resource blocks, e.g., via the reception component 704.

The apparatus may include a UE Information component 712 configured to information to the base station regarding a bandwidth used to monitor for the CRS, wherein the information comprises a maximum bandwidth for monitoring for the CRS or additional parameters that identify the set of resource blocks that the UE uses to monitor CRS. The apparatus may include a CRS resource block component 714 configured to determine a set of CRS resource blocks based on the set of monitored resource blocks. The determination may be made in a number of ways, as described in connection with FIG. 6. The apparatus may include a reduced bandwidth component 716 configured to receive a reduced bandwidth below a bandwidth capability of the UE, wherein the set of CRS resource blocks is based on the reduced bandwidth or an RB indication component 718 configured to receive an indication of the set of CRS resource blocks from the base station. The CRS resource block component may determine the set of CRS resource blocks based on the indications received via 716, 718.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
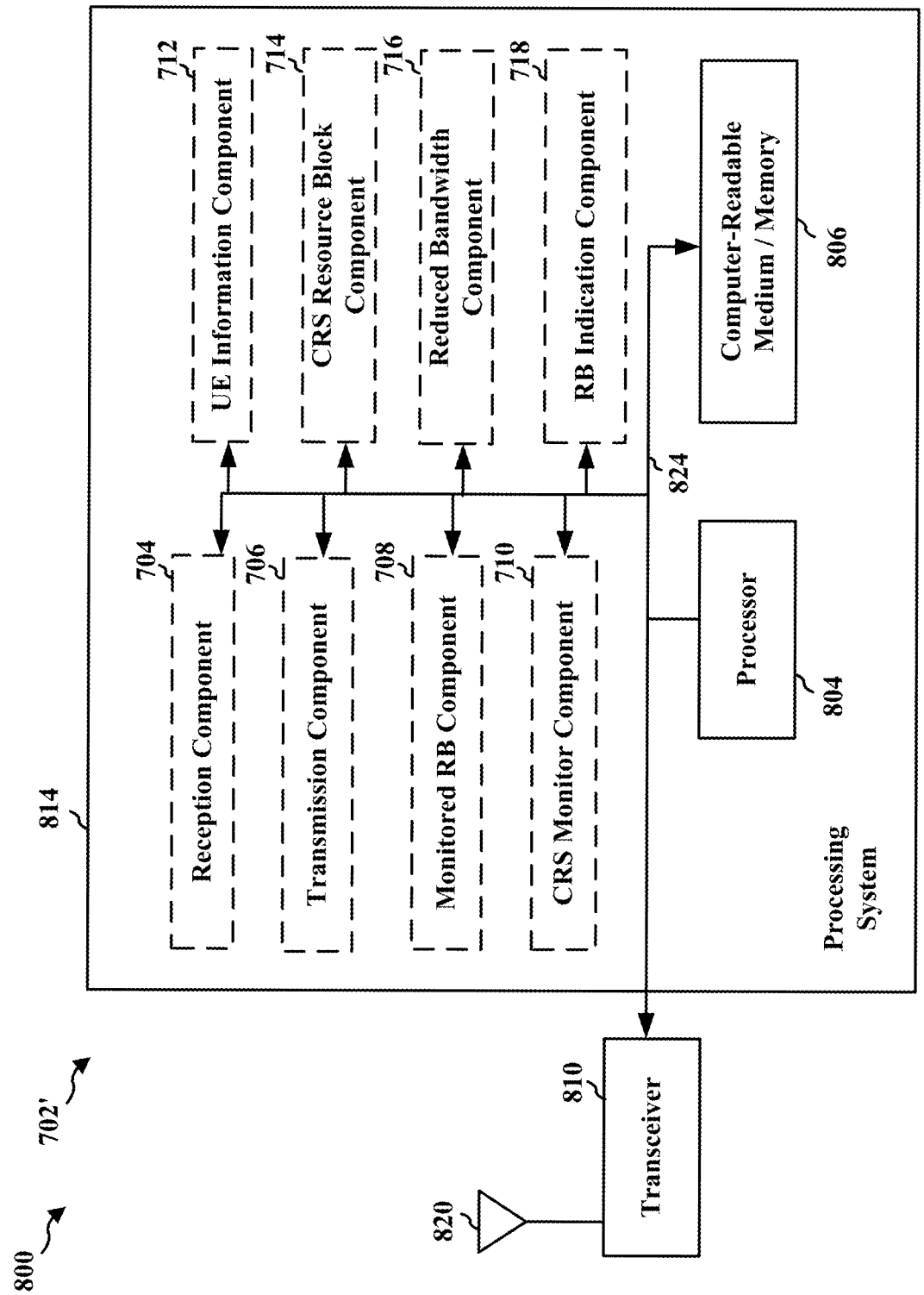
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for determining a set of monitored resource blocks for monitoring for cell specific reference signal (CRS) from a base station, means for monitoring for the CRS from the base station based on the set of monitored resource blocks, means for signaling information to the base station regarding a bandwidth used to monitor for the CRS, wherein the information comprises a maximum bandwidth for monitoring for the CRS, means for determining a set of CRS resource blocks based on the set of monitored resource blocks, and means for receiving at least one of an indication of a reduced bandwidth below a bandwidth capability of the UE, wherein the set of CRS resource blocks is based on the reduced bandwidth or an indication of the set of CRS resource blocks from the base station. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
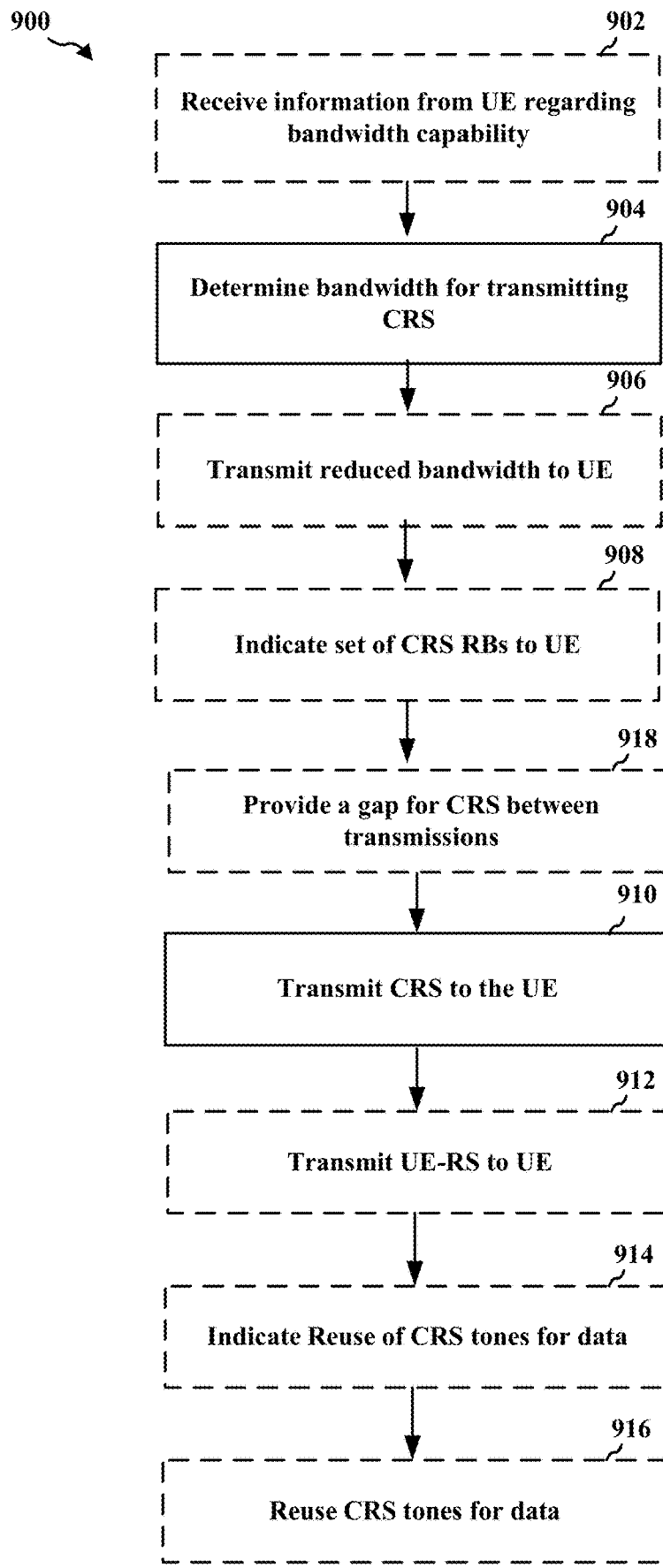
FIG. 9 is a flowchart of a method of wireless communication.

FIG. 9 is a flowchart 900 of a method of wireless communication at a base station. The method may be performed by a base station (e.g., base station 102, 180, 404, eNB 310, the apparatus 1002/1002'). Optional aspects of the flowchart are illustrated with a dashed line. At 904, the base station determines a bandwidth for transmitting a CRS to a user equipment, wherein the bandwidth is less than a system bandwidth. At 910, the base station transmits the CRS to the UE using the determined bandwidth, wherein the UE monitors for the CRS on a set of monitored resource blocks. The bandwidth determined by the base station may be based on or correspond to the set of monitored resource blocks.

Thus, the set of monitored resource blocks on subframes containing one or more of a PDCCH transmission, a PDCCH search space, or a PDSCH may comprise at least one of a first set of resource blocks allocated for a PDCCH or a PDCCH search space and a second set of resource blocks allocated for a PDSCH transmission on the subframe.

The monitored RBs may include all RBs in a narrowband that include RBs allocated to the PDCCH transmission, PDCCH search space or PDSCH allocation. The monitored RBs may include all RBs in between the PDCCH search space and PDSCH allocation when the UE is expected to monitor both the PDCCH search space and the PDSCH on the same subframe.

As described in connection with FIG. 6, the set of monitored resource blocks may comprise a first set of resource blocks allocated for a PDCCH search space. The set of monitored resource blocks may comprise a second set of resource blocks allocated for a PDSCH transmission. The set of monitored resource blocks may comprise a combination of a first set of resource blocks allocated for a PDCCH search space and a second set of resource blocks allocated for a PDSCH transmission.

The set of monitored resource blocks may further comprise a third set of resource blocks comprising resource blocks around the first set of resource blocks allocated for the PDCCH, the PDCCH search space, or the PDSCH transmission. For example, the third set of resource blocks may include a group of one or more resource blocks adjacent to the PDCCH, the PDCCH search space, or the PDSCH transmission in time and/or frequency, as described in connection with FIGS. 13A, 13B, 14A, and 14B. For example, the set of monitored resource blocks may further comprise a third set of resource blocks based on the allocated RBs for PDCCH/PDCCH search space/PDSCH on a previous subframe if the subframe is within N subframes before the subframe containing the PDCCH/PDCCH search space/PDSCH, wherein N is an integer greater than zero. The set of monitored resource blocks may further comprise a fourth set of resource blocks based on the allocated RBs for PDCCH/PDCCH search space or PDSCH in a subsequent subframe if the subframe is within M subframes after the subframe containing the PDCCH/PDCCH search space/PDSCH, wherein M is an integer greater than zero. The integer M, N may depend on the channel (e.g., PDCCH, PDCCH search space, PDSCH, etc.) and/or the UE bandwidth capability. The third set of resource blocks may span a same frequency as at least one of the first set of resource blocks allocated for the PDCCH transmission or the PDCCH search space and the second set of resource blocks allocated for the PDSCH transmission on the subframe in a subsequent subframe, and the fourth set of resource blocks may span the same frequency as at least one of the first set of resource blocks allocated for the PDCCH transmission or the PDCCH search space and the second set of resource blocks allocated for the PDSCH transmission on the subframe in a prior subframe, e.g., as described in connection with FIG. 14B.

FIG. 14B illustrates an example in which the monitored resource blocks comprise N resource blocks before the PDCCH/MPDCCH/PDSCH and M resource blocks after the PDCCH/MDCCH/PDSCH. While FIG. 14B illustrates an example in which M=1 and N=1, M and N may be any integer number greater than zero. The set of monitored resource blocks may further comprise a fifth set of resource blocks comprising X, Y resource blocks around the first set of resource blocks allocated for the PDCCH search space or second set of resource blocks allocated for the PDSCH transmission, wherein X is an integer greater than zero. For example, as described in connection with FIG. 13B, the monitored set may comprise X resource blocks in an adjacent higher frequency than the first set of resource blocks or the second set of resource blocks and Y resource blocks in an adjacent lower frequency than the first set of resource blocks or the second set of resource blocks. X, Y may depend on any of a type of channel (e.g., PDCCH/PDSCH/PBCH, etc.), a UE category (Cat M1/Cat M2/Cat M3), a system bandwidth, and/or the allocated RBs/narrowbands.

The subframe may be a valid subframe for eMTC operation. The subframes considered for checking the M and N subframe conditions may only be valid downlink subframes for eMTC operation. The subframes considered for checking the M and N subframe conditions may comprise all downlink subframes.

On subframes that satisfy both the M subframes after and N subframes before condition, the monitored RBs may be a union of RBs form both the sets of monitored RBs. Alternately, the monitored RBs may be only one set of monitored RBs. This may be based on timing from the prior monitored subframe and subsequent monitored subframe and the channel associated with the prior monitored subframes and subsequent monitored subframe.

The set of monitored RBs may include a center set of resource blocks having a size based on a bandwidth capability of the UE and the system bandwidth. The set of monitored RBs may be based on a set of resources blocks around the center frequency on a subset of subframes where the number of RBs and the subset of subframes is signaled by the base station (e.g., gNB) or determined implicitly at the UE. For example, a Cat M1 UE may monitor the center 6 RBs for CRS. A Cat M2 or higher UE may monitor the center 24 or 25 RBs for CRS. The selection may be performed based at least in part on a total system bandwidth.

The monitored RBs for subframes in between a PUSCH transmission and/or repetitions for a single TB are based on a transmission narrowband used by the UE for the PUSCH. The monitored RBs may include the narrowbands allocated for PUSCH if the duplexing scheme is time division duplexing (TDD). At 902, the base station may receive information from the UE regarding a bandwidth capability used to monitor for the CRS. The information may comprise a maximum bandwidth for monitoring for the CRS. The information may also comprise additional parameters that identify the set of monitored resource blocks that the UE uses to monitor CRS. The determination of the bandwidth at 904 may be based on the information received from the UE at 902.

At 906, the base station may transmit a reduced bandwidth below the bandwidth capability of the UE for use in monitoring for the CRS.

At 908, the base station may transmit an indication of a set of CRS resource blocks from the base station. The UE may use the indication to monitor for CRS from the base station.

The indication provided to the UE, e.g., at 908 may comprise a subset of subframes on which the CRS will be transmitted.

At 912, the base station may transmit UE-RS based communication to the UE, and at 914, the base station may reuse CRS tones for data for the UE-RS based communication. In this example, the base station may also indicate the reuse of the CRS tones for data to the UE at 916.

In another example, the base station may provide a gap between transmissions, wherein the CRS is transmitted in the gap.

Figure 10:
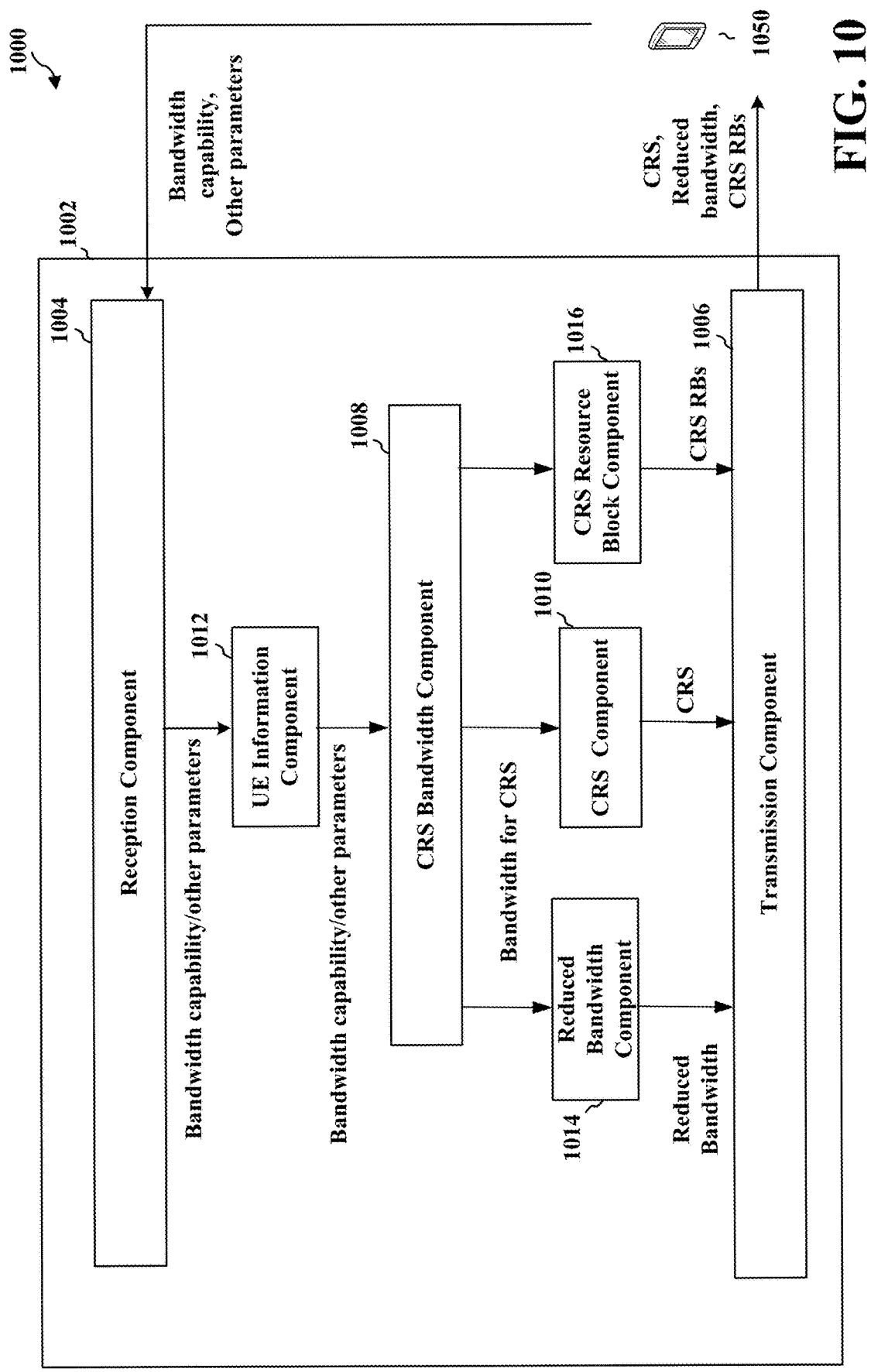
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station (e.g., base station 102, eNB 310). The apparatus includes a reception component 1004 that receive UL communication from UE 1050 and a transmission component 1006 that transmits DL communication to UE 1050, including CRS.

The apparatus may include a CRS bandwidth component 1008 configured to determine a bandwidth for transmitting a CRS to a user equipment, wherein the bandwidth is less than a system bandwidth a component and a CRS component 1010 configured to transmit the CRS to the UE using the determined bandwidth, e.g., via the transmission component 1006, wherein the UE monitors for the CRS on a set of monitored resource blocks. The apparatus may include a UE information component 1012 configured to receive information from the UE regarding a bandwidth capability used to monitor for the CRS, e.g., a maximum bandwidth for monitoring the CRS or additional parameters that identify the set of monitored resource blocks that the UE uses to monitor CRS.

The apparatus may include a reduced bandwidth component 1014 configured to transmit an indication of a reduced bandwidth below the bandwidth capability of the UE for use in monitoring for the CRS. The apparatus may include a CRS resource block component 1016 configured to transmit an indication of a set of CRS resource blocks.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
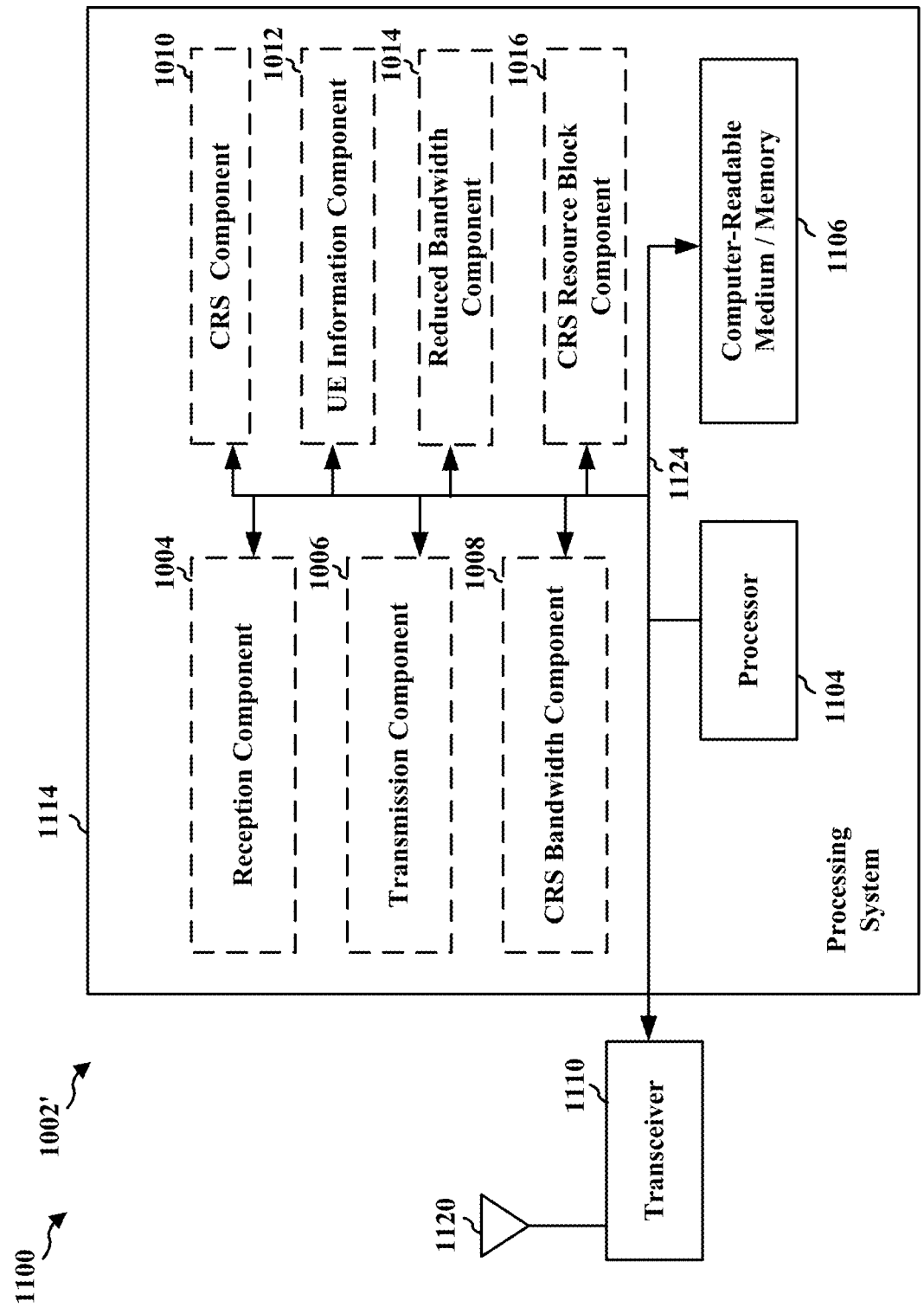
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375. In one configuration, the apparatus 1002/1002' for wireless communication includes means for determining a bandwidth for transmitting a CRS to a UE, means for transmitting the CRS to the UE using the determined bandwidth, means for receiving information from the UE regarding a bandwidth capability used to monitor for the CRS, means for transmitting an indication of a reduced bandwidth below the bandwidth capability of the UE for use in monitoring for the CRS, and means for transmitting an indication of a set of CRS resource blocks from the base station. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining a set of monitored resource blocks on at least one subframe for monitoring for cell specific reference signal (CRS) from a base station, wherein the set of monitored resource blocks comprises at least one of a first set of resource blocks allocated for a physical downlink control channel (PDCCH) transmission or a PDCCH search space, or a second set of resource blocks allocated for a physical downlink shared channel (PDSCH) transmission on a subframe, wherein the set of monitored resource blocks further comprises at least one of:
   a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
   a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero; and
   monitoring for the CRS from the base station on the at least one subframe based on the set of monitored resource blocks.

2. The method of claim 1, wherein the UE refrains from monitoring the CRS on other RBs on the at least one subframe.

3. The method of claim 1, wherein the PDCCH transmission comprises a physical broadcast channel (PBCH).

4. The method of claim 1, wherein the set of monitored resource blocks include each resource block in a narrowband allocated to the PDCCH transmission, the PDCCH search space or the PDSCH transmission.

5. The method of claim 1, wherein the set of monitored resource blocks include each resource block between the PDCCH search space and a PDSCH allocation when the UE is expected to monitor both the PDCCH search space and the PDSCH on the same subframe.

6. The method of claim 1, wherein the third set of resource blocks span a same frequency as at least one of the first set of resource blocks allocated for the PDCCH transmission or the PDCCH search space and the second set of resource blocks allocated for the PDSCH transmission on the subframe in a subsequent subframe, and
   wherein the fourth set of resource blocks span the same frequency as at least one of the first set of resource blocks allocated for the PDCCH transmission or the PDCCH search space and the second set of resource blocks allocated for the PDSCH transmission on the subframe in a prior subframe.

7. The method of claim 1, wherein the M and N depend on at least one of a channel type and a UE bandwidth capability.

8. The method of claim 1, wherein the subframe is a valid subframe for enhanced Machine Type Communication operation.

9. The method of claim 1, wherein subframes considered based on M and N are limited to valid downlink subframes for enhanced Machine Type Communication operation.

10. The method of claim 1, wherein subframes considered based on M and N comprise all DL subframes.

11. The method of claim 1, wherein for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise a union of resource blocks from both the third set of resource blocks and the fourth set of resource blocks.

12. The method of claim 1, for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise only a single set of the third set of resource blocks and the fourth set of resource blocks.

13. The method of claim 12, wherein the single set of the third set of resource blocks and the fourth set of resource blocks is based on timing from a prior monitored subframe and a subsequent monitored subframe and based on a channel associated with the prior monitored subframe and subsequent monitored subframe.

14. The method of claim 1, wherein the set of monitored resource blocks for monitoring for the CRS further comprise a fifth set of resource blocks comprising resource blocks around the first set of resource blocks allocated for the PDCCH search space or the second set of resource blocks allocated for the PDSCH transmission.

15. The method of claim 14, wherein the fifth set of resource blocks comprises X resource blocks in frequency above the first set of resource blocks or the second set of resource blocks and Y resource blocks in frequency below the first set of resource blocks or the second set of resource blocks.

16. The method of claim 15, wherein a resource block around the first set of resource blocks or the second set of resource blocks that fall outside of a system bandwidth are not included in the set of monitored resource blocks.

17. The method of claim 15, wherein X and Y depend on at least one of a channel type, a UE category, a system bandwidth, a resource block allocation, and allocated narrowbands.

18. The method of claim 1, wherein for the at least one subframe the set of monitored resource blocks for the CRS further includes:
a center set of resources blocks around a center frequency on a subset of subframes, where a number of resource blocks and the subset of subframes is signaled by the base station or determined implicitly at the UE.

19. The method of claim 18 wherein the UE comprises a Cat M1 UE, and wherein the Cat M1 UE monitors a center 6 resource blocks for the CRS.

20. The method of claim 18, wherein the UE comprises a Cat M2 or higher UE and monitors a center 24 or 25 resource blocks for the CRS, where a selection of the center set of resource blocks is based at least in part of a total system bandwidth.

21. The method of claim 1, wherein the set of monitored resource blocks for subframes in between a PUSCH transmission or repetitions for a single transport block are based on a transmission narrowband used by the UE for a physical uplink shared channel (PUSCH) transmission.

22. The method of claim 21, wherein when the UE is configured to monitor an early termination channel, the set of monitored resource blocks is based on a second set of resource blocks for the early termination channel, and
when the UE is not configured to monitor the early termination channel, the set of monitored resource blocks is based on a center set of resource blocks having a size based on a bandwidth capability of the UE.

23. The method of claim 21, wherein the set of monitored resource blocks include narrowbands allocated for PUSCH when a duplexing scheme is time division duplexing (TDD).

24. The method of claim 1, further comprising:
signaling information to the base station regarding a bandwidth used to monitor for the CRS, wherein the information comprises a maximum bandwidth for monitoring for the CRS.

25. The method of claim 24, wherein the information further comprises additional parameters that identify the set of monitored resource blocks that the UE uses to monitor for the CRS.

26. The method of claim 1, further comprising:
determining a set of CRS resource blocks based on the set of monitored resource blocks.

27. The method of claim 26, further comprising:
receiving an indication of a reduced bandwidth below a bandwidth capability of the UE, wherein the set of CRS resource blocks is based on the reduced bandwidth.

28. The method of claim 1, further comprising:
receiving an indication of a set of CRS resource blocks from the base station, wherein the set of monitored resource blocks is based at least in part on the indication of the set of CRS resource blocks.

29. The method of claim 26, wherein the set of CRS resource blocks is based on at least one of:
a system bandwidth;
the set of monitored resource blocks and a center set of resource blocks having a size based on a bandwidth capability of the UE; or
a network indication of the set of CRS resource blocks.

30. The method of claim 1, wherein a bandwidth of the set of monitored resource blocks for the CRS is a function of at least one of a channel and an allocation.

31. The method of claim 30, wherein when receiving MPDCCH, the bandwidth of the set of monitored resource blocks is based on a number of surrounding resource blocks on either side of the MPDCCH.

32. The method of claim 31, wherein when receiving PDSCH, the bandwidth of the set of monitored resource blocks is based on a size of the allocation for the PDSCH.

33. The method of claim 32, wherein the UE uses a first bandwidth when the PDSCH comprises a smaller frequency allocation and uses a second, larger bandwidth when the PDSCH comprises a larger frequency allocation.

34. The method of claim 1, wherein the set of monitored resource blocks comprises a number of resource blocks surrounding an allocation, wherein the UE monitors for the CRS across all frequencies on which the UE hops in multiple subframes.

35. The method of claim 34, wherein when a UE hops from a first narrowband in a first subframe to a second narrowband in a second subframe, the UE is allowed to monitor both the first narrowband and the second narrowband in both the first subframe and the second subframe for the CRS.

36. The method of claim 35, wherein when a UE hops from the first narrowband in the first subframe to the second narrowband in the second subframe, the UE is allowed to monitor either the first narrowband or the second narrowband or both based on whether it is the first subframe or the second subframe, whether the subframe contains a PDCCH or PDSCH or whether it is a subframe prior a start of the PDCCH transmission, the PDCCH search space, or the PDSCH transmission or is a subframe after an end of the PDCCH transmission, the PDCCH search space, or the PDSCH transmission.

37. An apparatus for wireless communication at a user equipment (UE), comprising:
means for determining a set of monitored resource blocks on at least one subframe for monitoring for cell specific reference signal (CRS) from a base station, wherein the set of monitored resource blocks comprises at least one of a first set of resource blocks allocated for a physical downlink control channel (PDCCH) transmission or a PDCCH search space, or a second set of resource blocks allocated for a physical downlink shared channel (PDSCH) transmission on a subframe, wherein the set of monitored resource blocks further comprises at least one of:
a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero; and
means for monitoring for the CRS from the base station on the at least one subframe based on the set of monitored resource blocks.

38. The apparatus of claim 37, further comprising:
means for signaling information to the base station regarding a bandwidth used to monitor for the CRS, wherein the information comprises a maximum bandwidth for monitoring for the CRS.

39. The apparatus of claim 37, further comprising:
means for determining a set of CRS resource blocks based on the set of monitored resource blocks.

40. The apparatus of claim 39, further comprising:
means for receiving at least one of a first indication of a reduced bandwidth below a bandwidth capability of the UE, wherein the set of CRS resource blocks is based on the reduced bandwidth, or a second indication of the set of CRS resource blocks from the base station.

41. An apparatus for wireless communication at a user equipment (UE), comprising:
a memory; and
at least one processor coupled to the memory and configured to cause the apparatus to:
determine a set of monitored resource blocks on at least one subframe for monitoring for cell specific reference signal (CRS) from a base station, wherein the set of monitored resource blocks comprises at least one of a first set of resource blocks allocated for a physical downlink control channel (PDCCH) transmission or a PDCCH search space, or a second set of resource blocks allocated for a physical downlink shared channel (PDSCH) transmission on a subframe, wherein the set of monitored resource blocks further comprises at least one of:
a third set of resource blocks determined based on the allocated resource blocks for the PDCCH transmission, the PDCCH search space or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero; and
monitor for the CRS from the base station on the at least one subframe based on the set of monitored resource blocks.

42. The apparatus of claim 41, wherein the UE refrains from monitoring the CRS on other RBs on the at least one subframe.

43. The apparatus of claim 41, wherein the PDCCH transmission comprises a physical broadcast channel (PBCH).

44. The apparatus of claim 41, wherein the set of monitored resource blocks include each resource block in a narrowband allocated to the PDCCH transmission, the PDCCH search space or the PDSCH transmission.

45. The apparatus of claim 41, wherein the set of monitored resource blocks include each resource block between the PDCCH search space and a PDSCH allocation when the UE is expected to monitor both the PDCCH search space and the PDSCH on the same subframe.

46. The apparatus of claim 41, wherein the M and N depend on at least one of a channel type and a UE bandwidth capability.

47. The apparatus of claim 41, wherein the subframe is a valid subframe for enhanced Machine Type Communication operation.

48. The apparatus of claim 41, wherein subframes considered based on M and N are limited to valid downlink subframes for enhanced Machine Type Communication operation.

49. The apparatus of claim 41, wherein subframes considered based on M and N comprise all DL subframes.

50. The apparatus of claim 41, wherein for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise a union of resource blocks from both the third set of resource blocks and the fourth set of resource blocks.

51. The apparatus of claim 41, wherein for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise only a single set of the third set of resource blocks and the fourth set of resource blocks.

52. The apparatus of claim 51, wherein the single set of the third set of resource blocks and the fourth set of resource blocks is based on timing from a prior monitored subframe and a subsequent monitored subframe and based on a channel associated with the prior monitored subframe and subsequent monitored subframe.

53. The apparatus of claim 41, wherein the set of monitored resource blocks for monitoring for the CRS further comprise a fifth set of resource blocks comprising resource blocks around the first set of resource blocks allocated for the PDCCH search space or the second set of resource blocks allocated for the PDSCH transmission.

54. The apparatus of claim 53, wherein the fifth set of resource blocks comprises X resource blocks in frequency above the first set of resource blocks or the second set of resource blocks and Y resource blocks in frequency below the first set of resource blocks or the second set of resource blocks.

55. The apparatus of claim 54, wherein a resource block around the first set of resource blocks or the second set of resource blocks that fall outside of a system bandwidth are not included in the set of monitored resource blocks.

56. The apparatus of claim 54, wherein X and Y depend on at least one of a channel type, a UE category, a system bandwidth, a resource block allocation, and allocated narrowbands.

57. The apparatus of claim 41, wherein for the at least one subframe the set of monitored resource blocks for the CRS further includes:
a center set of resources blocks around a center frequency on a subset of subframes, where a number of resource blocks and the subset of subframes is signaled by the base station or determined implicitly at the UE.

58. The apparatus of claim 57 wherein the UE comprises a Cat M1 UE, and wherein the Cat M1 UE monitors a center 6 resource blocks for the CRS.

59. The apparatus of claim 57, wherein the UE comprises a Cat M2 or higher UE and monitors a center 24 or 25 resource blocks for the CRS, where a selection of the center set of resource blocks is based at least in part of a total system bandwidth.

60. The apparatus of claim 41, wherein the set of monitored resource blocks for subframes in between a PUSCH transmission or repetitions for a single transport block are based on a transmission narrowband used by the UE for a physical uplink shared channel (PUSCH) transmission.

61. The apparatus of claim 60, wherein when the UE monitors an early termination channel, the set of monitored resource blocks is based on a second set of resource blocks for the early termination channel, and
when the UE does not monitor the early termination channel, the set of monitored resource blocks is based on a center set of resource blocks having a size based on a bandwidth capability of the UE.

62. The apparatus of claim 60, wherein the set of monitored resource blocks include narrowbands allocated for PUSCH when a duplexing scheme is time division duplexing (TDD).

63. The apparatus of claim 41, wherein the at least one processor is further configured to cause the apparatus to:
signal information to the base station regarding a bandwidth used to monitor for the CRS, wherein the information comprises a maximum bandwidth for monitoring for the CRS.

64. The apparatus of claim 41, wherein the at least one processor is further configured to cause the apparatus to:
determine a set of CRS resource blocks based on the set of monitored resource blocks.

65. The apparatus of claim 64, wherein the at least one processor is further configured to cause the apparatus to:
receive at least one of a first indication of a reduced bandwidth below a bandwidth capability of the UE, wherein the set of CRS resource blocks is based on the reduced bandwidth, or a second indication of the set of CRS resource blocks from the base station.

66. A non-transitory computer-readable medium storing computer executable code for wireless communication at a user equipment (UE), comprising code to:
determine a set of monitored resource blocks on at least one subframe for monitoring for cell specific reference signal (CRS) from a base station, wherein the set of monitored resource blocks comprises at least one of a first set of resource blocks allocated for a physical downlink control channel (PDCCH) transmission or a PDCCH search space, or a second set of resource blocks allocated for a physical downlink shared channel (PDSCH) transmission on a subframe, wherein the set of monitored resource blocks further comprises at least one of:
a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space or the PDSCH transmission and within M subframes before the subframe containing the PDCCH search space, the PDCCH transmission, or the PDSCH transmission, wherein M is a second integer greater than zero; and
monitor for the CRS from the base station on the at least one subframe based on the set of monitored resource blocks.

67. The non-transitory computer-readable medium of claim 66, further comprising code to:
signal information to the base station regarding a bandwidth used to monitor for the CRS, wherein the information comprises a maximum bandwidth for monitoring for the CRS.

68. The non-transitory computer-readable medium of claim 66, further comprising code to:
determine a set of CRS resource blocks based on the set of monitored resource blocks.

69. The non-transitory computer-readable medium of claim 68, further comprising code to:
receive at least one of a first indication of a reduced bandwidth below a bandwidth capability of the UE, wherein the set of CRS resource blocks is based on the reduced bandwidth or a second indication of the set of CRS resource blocks from the base station.

70. A method of wireless communication at a base station, comprising:
determining a bandwidth for transmitting a cell specific reference signal (CRS) to a user equipment on at least one subframe, wherein the bandwidth is less than a system bandwidth; and
transmitting the CRS to the UE using the determined bandwidth, wherein the UE monitors for the CRS on the at least one subframe on a set of monitored resource blocks, and wherein the bandwidth is determined based on the set of monitored resource blocks, wherein the set of monitored resource blocks comprises at least one of a first set of resource blocks allocated for a physical downlink control channel (PDCCH) search space or a PDCCH, or a second set of resource blocks allocated for a physical downlink shared channel (PDSCH) transmission on a subframe, and wherein the set of monitored resource blocks further comprise at least one of:

a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero.

71. The method of claim 70, wherein the set of monitored resource blocks include each resource block in a narrowband allocated to the PDCCH transmission, the PDCCH search space or the PDSCH transmission.

72. The method of claim 70, wherein the set of monitored resource blocks include each resource block between the PDCCH search space and a PDSCH allocation when the UE is expected to monitor both the PDCCH search space and the PDSCH on the same subframe.

73. The method of claim 70, wherein the M and N depend on at least one of a channel type and a UE bandwidth capability.

74. The method of claim 70, wherein the subframe is a valid subframe for enhanced Machine Type Communication operation.

75. The method of claim 70, wherein subframes considered based on M and N are limited to valid downlink subframes for enhanced Machine Type Communication operation.

76. The method of claim 70, wherein subframes considered based on M and N comprise all DL subframes.

77. The method of claim 70, wherein for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise a union of resource blocks from both the third set of resource blocks and the fourth set of resource blocks.

78. The method of claim 70, wherein for subframes that are both M subframes after a first subframe containing the PDCCH, the PDCCH search space, or the PDSCH and N subframes before a second subframe containing the PDCCH, the PDCCH search space or the PDSCH, the set of monitored resource blocks comprise only a single set of the third set of resource blocks and the fourth set of resource blocks.

79. The method of claim 78, wherein the single set of the third set of resource blocks and the fourth set of resource blocks is based on timing from a prior monitored subframe and a subsequent monitored subframe and based on a channel associated with the prior monitored subframe and subsequent monitored subframe.

80. The method of claim 70, wherein the set of monitored resource blocks for monitoring for the CRS further comprise a fifth set of resource blocks comprising resource blocks around the first set of resource blocks allocated for the PDCCH search space or second set of resource blocks allocated for the PDSCH transmission.

81. The method of claim 80, wherein the fifth set of resource blocks comprises X resource blocks in frequency above the first set of resource blocks or the second set of resource blocks and Y resource blocks in frequency below the first set of resource blocks or the second set of resource blocks.

82. The method of claim 81, wherein a resource block around the first set of resource blocks or the second set of resource blocks that fall outside of a system bandwidth are not included in the set of monitored resource blocks.

83. The method of claim 81, wherein X and Y depend on at least one of a channel type, a UE category, a system bandwidth, a resource block allocation, and allocated narrowbands.

84. The method of claim 70, wherein for the at least one subframe the set of monitored resource blocks for the CRS further includes:
a center set of resources blocks around a center frequency on a subset of subframes, where a number of resource blocks and the subset of subframes is signaled by the base station or determined implicitly at the UE.

85. The method of claim 74, wherein the UE comprises a Cat M1 UE, and wherein the Cat M1 UE monitors a center 6 resource blocks for the CRS.

86. The method of claim 74, wherein the UE comprises a Cat M2 or higher UE and monitors a center 24 or 25 resource blocks for the CRS, where a selection of the center set of resource blocks is based at least in part of a total system bandwidth.

87. The method of claim 70, wherein the set of monitored resource blocks for subframes in between a PUSCH transmission or repetitions for a single transport block are based on a transmission narrowband used by the UE for a physical uplink shared channel (PUSCH) transmission.

88. The method of claim 70, further comprising:
receiving information from the UE regarding a bandwidth capability used to monitor for the CRS, wherein the information comprises at least one of:
a maximum bandwidth for monitoring for the CRS; and
additional parameters that identify the set of monitored resource blocks that the UE uses to monitor for the CRS.

89. The method of claim 88, further comprising:
transmitting an indication of a reduced bandwidth below the bandwidth capability of the UE for use in monitoring for the CRS.

90. The method of claim 70, further comprising:
transmitting an indication of a set of CRS resource blocks from the base station.

91. The method of claim 90, wherein the indication comprises a subset of subframes on which the CRS will be transmitted.

92. The method of claim 70, further comprising:
transmitting UE specific reference signal (UE-RS) based communication to the UE; and
reusing CRS tones for data for the UE-RS based communication.

93. The method of claim 92, further comprising:
indicating reuse of the CRS tones for data to the UE.

94. The method of claim 70, further comprising:
providing a gap between transmissions, wherein the CRS is transmitted in the gap.

95. An apparatus for wireless communication at a base station, comprising:
means for determining a bandwidth for transmitting a cell specific reference signal (CRS) to a user equipment (UE) on at least one subframe, wherein the bandwidth is less than a system bandwidth; and
means for transmitting the CRS to the UE using the determined bandwidth, wherein the UE monitors for the CRS on the at least one subframe on a set of monitored resource blocks and wherein the bandwidth is determined based on the set of monitored resource blocks, wherein the set of monitored resource blocks comprises at least one of a first set of resource blocks allocated for a physical downlink control channel (PDCCH) search space or a PDCCH, or a second set of resource blocks allocated for a physical downlink shared channel (PDSCH) transmission on a subframe, and wherein the set of monitored resource blocks further comprise at least one of:
a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero.

96. The apparatus of claim 95, further comprising:
means for receiving information from the UE regarding a bandwidth capability used to monitor for the CRS, wherein the information comprises at least one of:
a maximum bandwidth for monitoring for the CRS; or
additional parameters that identify the set of monitored resource blocks that the UE uses to monitor for the CRS.

97. The apparatus of claim 96, further comprising:
means for transmitting at least one of a first indication of a reduced bandwidth below the bandwidth capability of the UE for use in monitoring for the CRS or a second indication of a set of CRS resource blocks from the base station.

98. An apparatus for wireless communication at a base station, comprising:
a memory; and
at least one processor coupled to the memory and configured to cause the apparatus to:
determine a bandwidth for transmitting a cell specific reference signal (CRS) to a user equipment (UE) on at least one subframe, wherein the bandwidth is less than a system bandwidth; and
transmit the CRS to the UE using the determined bandwidth, wherein the UE monitors for the CRS on the at least one subframe on a set of monitored resource blocks and wherein the bandwidth is determined based on the set of monitored resource blocks, wherein the set of monitored resource blocks comprises at least one of a first set of resource blocks allocated for a physical downlink control channel (PDCCH) search space or a PDCCH, or a second set of resource blocks allocated for a physical downlink shared channel (PDSCH) transmission on a subframe, and wherein the set of monitored resource blocks further comprise at least one of:
a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero.

99. The apparatus of claim 98, wherein the at least one processor is further configured to cause the apparatus to:
receive information from the UE regarding a bandwidth capability used to monitor for the CRS, wherein the information comprises at least one of:
a maximum bandwidth for monitoring for the CRS; or
additional parameters that identify the set of monitored resource blocks that the UE uses to monitor for the CRS.

100. The apparatus of claim 99, wherein the at least one processor is further configured to cause the apparatus to:
transmit at least one of a first indication of a reduced bandwidth below the bandwidth capability of the UE for use in monitoring for the CRS or a second indication of a set of CRS resource blocks from the base station.

101. A non-transitory computer-readable medium storing computer executable code for wireless communication at a base station, comprising code to:
determine a bandwidth for transmitting a cell specific reference signal (CRS) to a user equipment (UE) on at least one subframe, wherein the bandwidth is less than a system bandwidth; and
transmit the CRS to the UE using the determined bandwidth, wherein the UE monitors for the CRS on the at least one subframe on a set of monitored resource blocks and wherein the bandwidth is determined based on the set of monitored resource blocks, wherein the set of monitored resource blocks comprises at least one of a first set of resource blocks allocated for a physical downlink control channel (PDCCH) search space or a PDCCH, or a second set of resource blocks allocated for a physical downlink shared channel (PDSCH) transmission on a subframe and wherein the set of monitored resource blocks further comprises at least one of:
a third set of resource blocks determined based on the allocated resource blocks for the PDCCH transmission, the PDCCH search space, or the PDSCH transmission and within N subframes after the subframe containing the PDCCH search space, the PDCCH transmission, or the PDSCH transmission, wherein N is a first integer greater than zero, or
a fourth set of resource blocks determined based on the allocated resource blocks for the PDCCH transmission, the PDCCH search space, or the PDSCH transmission and within M subframes before the subframe containing the PDCCH search space, the PDCCH transmission, or the PDSCH transmission, wherein M is a second integer greater than zero.

102. The non-transitory computer-readable medium of claim 101, further comprising code to:
receive information from the UE regarding a bandwidth capability used to monitor for the CRS, wherein the information comprises at least one of:
a maximum bandwidth for monitoring for the CRS; or
additional parameters that identify the set of monitored resource blocks that the UE uses to monitor for the CRS.

103. The non-transitory computer-readable medium of claim 102, further comprising code to:
- transmit at least one of a first indication of a reduced bandwidth below the bandwidth capability of the UE for use in monitoring for the CRS or a second indication of a set of CRS resource blocks from the base station.

104. The method of claim 1, further comprising:
- monitoring for the CRS from the base station during an uplink gap occurring between uplink transmissions.

* * * * *